(12) United States Patent
Saig

(10) Patent No.: US 10,687,176 B2
(45) Date of Patent: *Jun. 16, 2020

(54) TRANSCEIVER CIRCUIT EMPLOYING SHARED DIGITAL SIGNAL PROCESSING CIRCUITRY FOR COMMUNICATING RADIO FREQUENCY (RF) ANALOG COMMUNICATIONS SIGNALS RECEIVED BY A REMOTE UNIT IN A WIRELESS DISTRIBUTION SYSTEM (WDS)

(71) Applicant: Corning Optical Communications LLC, Charlotte, NC (US)

(72) Inventor: Maor Saig, Shaarey-Tikva (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,764

(22) Filed: Nov. 19, 2018

(65) Prior Publication Data
US 2019/0090100 A1    Mar. 21, 2019

Related U.S. Application Data

(63) Continuation of application No. 15/228,450, filed on Aug. 4, 2016, now Pat. No. 10,142,801.

(51) Int. Cl.
*H04W 4/06* (2009.01)
*H04W 88/08* (2009.01)

(52) U.S. Cl.
CPC ........... *H04W 4/06* (2013.01); *H04W 88/085* (2013.01)

(58) Field of Classification Search
CPC .............................. H04W 4/06; H04W 88/085
See application file for complete search history.

(56) References Cited

U.S. PATENT DOCUMENTS

| 6,940,916 B1 | 9/2005 | Warner et al. |
| 8,873,674 B2 | 10/2014 | Kim et al. |

(Continued)

FOREIGN PATENT DOCUMENTS

| WO | 2013063025 A1 | 5/2013 |
| WO | 2016075696 A1 | 5/2016 |

(Continued)

OTHER PUBLICATIONS

"Kahn et al., U.S. Appl. No. 62/634,312 A system and method for bandwidth expansion and frequency scaling filed Jul. 2016 (Year 2016)".

(Continued)

*Primary Examiner* — Ian N Moore
*Assistant Examiner* — Justin T Van Roie
(74) *Attorney, Agent, or Firm* — C. Keith Montgomery

(57) ABSTRACT

Embodiments of the disclosure relate to a transceiver circuit employing shared digital signal processing circuitry for communicating radio frequency (RF) analog communications signals received by a remote unit in a wireless distribution system (WDS). A transceiver circuit includes downlink digital signal processing circuitry that receives and processes a downlink digital communications signal(s) having a first downlink digital baseband signal and a second downlink digital baseband signal. A first downlink analog signal path and a second downlink analog signal path share the downlink digital signal processing circuitry. The first downlink analog signal path generates a first downlink analog RF communications signal. The second downlink analog signal path generates a second downlink analog RF communications signal. By sharing the downlink digital signal processing circuitry, it is not necessary to add additional downlink digital signal processing circuitry, thus (Continued)

helping reduce digital component costs of the transceiver circuit.

18 Claims, 11 Drawing Sheets

(56) References Cited

U.S. PATENT DOCUMENTS

| | | | |
|---|---|---|---|
| 10,142,801 B2 * | 11/2018 | Saig | H04W 88/085 |
| 2009/0180423 A1 | 7/2009 | Kroener | |
| 2012/0177026 A1 | 7/2012 | Uyehara et al. | |
| 2014/0308043 A1 * | 10/2014 | Heidler | H04B 10/11 |
| | | | 398/115 |
| 2015/0350756 A1 | 12/2015 | Cune et al. | |
| 2015/0351008 A1 | 12/2015 | Mayor | |
| 2016/0094293 A1 | 3/2016 | Magnezi | |
| 2018/0026689 A1 | 1/2018 | Khan et al. | |

FOREIGN PATENT DOCUMENTS

| | | |
|---|---|---|
| WO | 2016098101 A1 | 6/2016 |
| WO | 2016098109 A1 | 6/2016 |
| WO | 2016098111 A1 | 6/2016 |

OTHER PUBLICATIONS

Non-Final Office Action for U.S. Appl. No. 15/228,450, dated Apr. 5, 2018, 17 pages.
Notice of Allowance for U.S. Appl. No. 15/228,450, dated Sep. 6, 2018, 8 pages.

* cited by examiner

TRANSCEIVER CIRCUIT EMPLOYING SHARED DIGITAL SIGNAL PROCESSING CIRCUITRY FOR COMMUNICATING RADIO FREQUENCY (RF) ANALOG COMMUNICATIONS SIGNALS RECEIVED BY A REMOTE UNIT IN A WIRELESS DISTRIBUTION SYSTEM (WDS)

PRIORITY APPLICATIONS

This application is a continuation of U.S. application Ser. No. 15/228,450 filed on Aug. 4, 2016, now issued as U.S. Pat. No. 10,142,801, the content of which is relied upon and incorporated herein by reference in its entirety.

BACKGROUND

The disclosure relates generally to a transceiver circuit provided in a remote unit in a wireless distribution system (WDS), and more particularly to a transceiver circuit employing shared digital signal processing circuitry for communicating radio frequency (RF) analog communications signals in a WDS network.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of WDSs. WDSs include remote units configured to receive and transmit communications signals to client devices within the antenna range of the remote units. WDSs can be particularly useful when deployed inside buildings or other indoor environments where the wireless communications devices may not otherwise be able to effectively receive RF signals from a signal source.

In this regard, FIG. 1 illustrates distribution of communication services to remote coverage areas 100(1)-100(N) of a WDS 102 provided in the form of a DAS, wherein 'N' is the number of remote coverage areas. These communication services can include cellular services, wireless services, such as RF identification (RFID) tracking, Wireless Fidelity (Wi-Fi), local area network (LAN), wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver (not shown) and a respective antenna 114(1)-114(N) operably connected to the RF transmitter/receiver to wirelessly distribute the communication services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

The remote units 104(1)-104(N) include transceiver circuits (not shown) for processing the downlink communications signals 110D and the uplink communications signals 110U. In a non-limiting example, the HEE 106 converts the downlink communications signals 110D into downlink digital communications signals 110$d$D for distribution to the remote units 104(1)-104(N) over the communications medium 112. Likewise, the remote units 104(1)-104(N) convert the uplink communications signals 110U into uplink digital communications signals 110$d$U for distribution to the HEE 106 over the communications medium 112. In this regard, the transceiver circuits in the remote units 104(1)-104(N) typically include both analog processing circuitries (not shown) and digital processing circuitries (not shown) for processing the downlink digital communications signals 110$d$D and the uplink digital communications signals 110$d$U.

No admission is made that any reference cited herein constitutes prior art. Applicant expressly reserves the right to challenge the accuracy and pertinency of any cited documents.

SUMMARY

Embodiments of the disclosure relate to a transceiver circuit employing shared digital signal processing circuitry for communicating radio frequency (RF) analog communications signals received by a remote unit in a wireless distribution system (WDS). A remote unit in the WDS may be configured to distribute analog RF communications signals in distanced analog RF channels that spread across a wider RF spectrum than a predefined digital signal processing bandwidth of a transceiver circuit. In this regard, in exemplary aspects disclosed herein, a transceiver circuit is provided in at least one remote unit in a WDS. The transceiver circuit includes downlink digital signal processing circuitry that is shared between a first downlink analog signal path and a second downlink analog signal path. The transceiver circuit includes the first downlink analog signal path and the second analog signal path configured to generate and distribute a first downlink analog RF communications signal in a first downlink analog RF channel and a second downlink analog RF communications signal in a second downlink analog RF channel based on the downlink digital communications signal(s). In a non-limiting example, the first downlink analog RF channel and the second downlink analog RF channel occupy a wider downlink RF spectrum than the predefined downlink digital signal processing bandwidth. In one aspect, the downlink digital signal processing circuitry up-converts the first downlink digital baseband signal and the second downlink digital baseband signal into a first downlink analog signal in a first selected downlink frequency and a second downlink analog signal in a second selected downlink frequency, respectively. In another aspect, the first downlink analog signal path and the second downlink analog signal path are configured to share the downlink digital signal processing circuitry. The first downlink analog signal path converts the first downlink analog signal into the first downlink analog RF communications signal for distribution in the first downlink analog RF channel. The second downlink analog signal path converts the second downlink analog signal into the second downlink analog RF communications signal for distribution in the second downlink analog RF channel. Thus, by sharing the downlink digital signal processing circuitry between the first downlink analog signal path and the second downlink analog signal path, it is not necessary to add additional downlink digital signal processing circuitry in the transceiver circuit, thus helping to reduce digital component costs of the transceiver circuit.

One embodiment of the disclosure relates to a transceiver circuit provided in at least one remote unit in a WDS. The transceiver circuit comprises downlink digital signal processing circuitry having a predefined downlink digital signal processing bandwidth. The downlink digital signal processing circuitry comprises a digital up-converter (DUC). The DUC is configured to receive a downlink digital communications signal comprising a first downlink digital baseband signal in a first downlink digital channel and a second downlink digital baseband signal in a second downlink digital channel. The DUC is also configured to generate an intermediate downlink digital communications signal comprising the first downlink digital baseband signal in a first selected downlink frequency and the second downlink digital baseband signal in a second selected downlink frequency. The downlink digital signal processing circuitry also comprises a digital-to-analog converter (DAC) configured to receive and convert the intermediate downlink digital communications signal into a downlink analog communications signal comprising a first downlink analog signal in the first selected downlink frequency and a second downlink analog signal in the second selected downlink frequency. The transceiver circuit also comprises a first downlink analog signal path. The first downlink analog signal path is configured to receive the downlink analog communications signal. The first downlink analog signal path is also configured to convert the first downlink analog signal into a first downlink analog RF communications signal in a first downlink analog RF channel. The transceiver circuit also comprises a second downlink analog signal path. The second downlink analog signal path is configured to receive the downlink analog communications signal. The second downlink analog signal path is also configured to convert the second downlink analog signal into a second downlink analog RF communications signal in a second downlink analog RF channel.

Another embodiment of the disclosure relates to a method for communicating RF analog communications signals by sharing digital signal processing circuitry in a WDS. The method comprises receiving a downlink digital communications signal comprising a first downlink digital baseband signal in a first downlink digital channel and a second downlink digital baseband signal in a second downlink digital channel. The method also comprises generating an intermediate downlink digital communications signal comprising the first downlink digital baseband signal in a first selected downlink frequency and the second downlink digital baseband signal in a second selected downlink frequency. The method also comprises converting the intermediate downlink digital communications signal into a downlink analog communications signal comprising a first downlink analog signal in the first selected downlink frequency and a second downlink analog signal in the second selected downlink frequency. The method also comprises converting the first downlink analog signal into a first downlink analog RF communications signal in a first downlink analog RF channel. The method also comprises converting the second downlink analog signal into a second downlink analog RF communications signal in a second downlink analog RF channel.

Another embodiment of the disclosure relates to a WDS. The WDS comprises a central unit and a plurality of remote units. The plurality of remote units is configured to receive a plurality of downlink electrical communications signals from the central unit. The plurality of remote units is also configured to provide a plurality of uplink electrical communications signals to the central unit. At least one remote unit among the plurality of remote units comprises a transceiver circuit. The transceiver circuit comprises downlink digital signal processing circuitry having a predefined downlink digital signal processing bandwidth. The downlink digital signal processing circuitry comprises a DUC. The DUC is configured to receive a downlink digital communications signal among the plurality of downlink electrical communications signals, the downlink digital communications signal comprising a first downlink digital baseband signal in a first downlink digital channel and a second downlink digital baseband signal in a second downlink digital channel. The DUC is also configured to generate an intermediate downlink digital communications signal comprising the first downlink digital baseband signal in a first selected downlink frequency and the second downlink digital baseband signal in a second selected downlink frequency. The downlink digital signal processing circuitry also comprises a DAC configured to receive and convert the intermediate downlink digital communications signal into a downlink analog communications signal comprising a first downlink analog signal in the first selected downlink frequency and a second downlink analog signal in the second selected downlink frequency. The transceiver circuit also comprises a first downlink analog signal path. The first downlink analog signal path is configured to receive the downlink analog communications signal. The first downlink analog signal path is also configured to convert the first downlink analog signal into a first downlink analog RF communications signal in a first downlink analog RF channel. The transceiver circuit also comprises a second downlink analog signal path. The second downlink analog signal path is configured to receive the downlink analog communications signal. The second downlink analog signal path is also configured to convert the second downlink analog signal into a second downlink analog RF communications signal in a second downlink analog RF channel.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to a transceiver circuit employing shared digital signal processing circuitry for communicating radio frequency (RF) analog communications signals received by a remote unit in a wireless distribution system (WDS). A remote unit in the WDS may be configured to distribute analog RF communications signals in distanced analog RF channels that spread across a wider RF spectrum than a predefined digital signal processing bandwidth of a transceiver circuit. In this regard, in exemplary aspects disclosed herein, a transceiver circuit is provided in at least one remote unit in a WDS. The transceiver circuit includes downlink digital signal processing circuitry that is shared between a first downlink analog signal path and a second downlink analog signal path. The transceiver circuit includes the first downlink analog signal path and the second analog signal path configured to generate and distribute a first downlink analog RF communications signal in a first downlink analog RF channel and a second downlink analog RF communications signal in a second downlink analog RF channel based on the downlink digital communications signal(s). In a non-limiting example, the first downlink analog RF channel and the second downlink analog RF channel occupy a wider downlink RF spectrum than the predefined downlink digital signal processing bandwidth. In one aspect, the downlink digital signal processing circuitry up-converts the first downlink digital baseband signal and the second downlink digital baseband signal into a first downlink analog signal in a first selected downlink frequency and a second downlink analog signal in a second selected downlink frequency, respectively. In another aspect, the first downlink analog signal path and the second downlink analog signal path are configured to share the downlink digital signal processing circuitry. The first downlink analog signal path converts the first downlink analog signal into the first downlink analog RF communications signal for distribution in the first downlink analog RF channel. The second downlink analog signal path converts the second downlink analog signal into the second downlink analog RF communications signal for distribution in the second downlink analog RF channel. Thus, by sharing the downlink digital signal processing circuitry between the first downlink analog signal path and the second downlink analog signal path, it is not necessary to add additional downlink digital signal processing circuitry in the transceiver circuit, thus helping to reduce digital component costs of the transceiver circuit.

Figure 1:
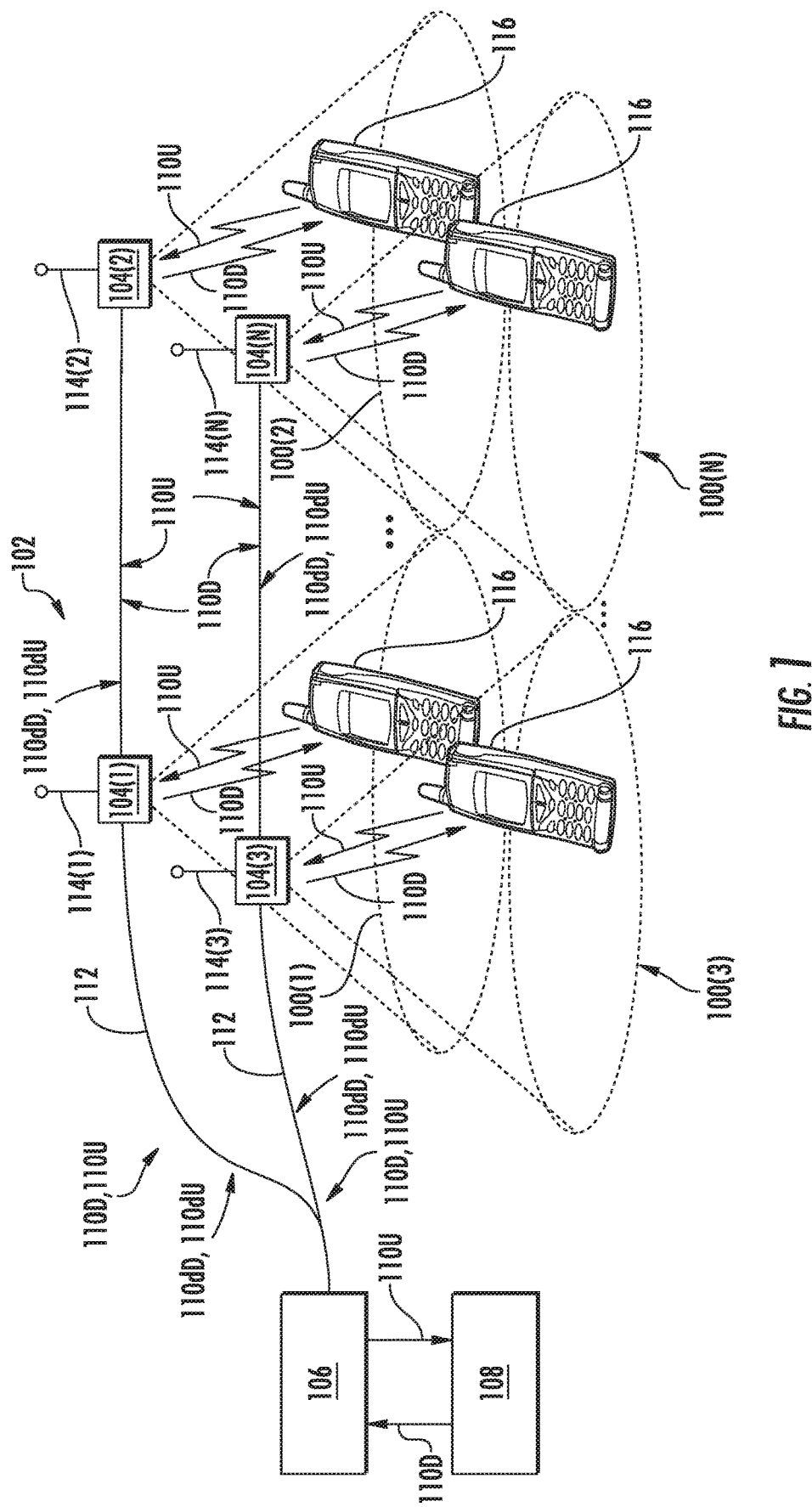
FIG. 1 is a schematic diagram of an exemplary wireless distribution system (WDS)
Figure 2:
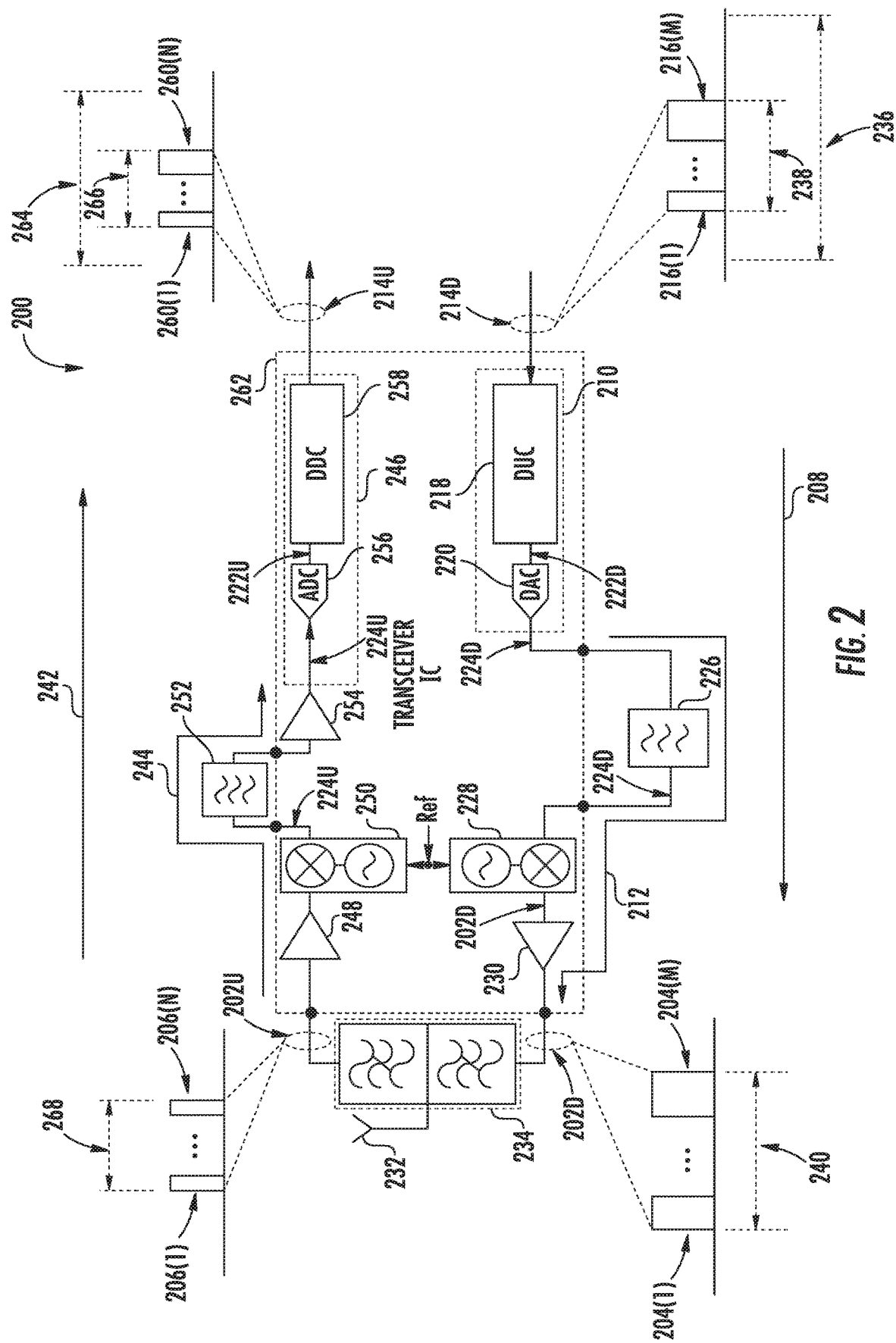
FIG. 2 is a schematic diagram of an exemplary conventional transceiver circuit for communicating a downlink analog radio frequency (RF) communications signal in one or more downlink analog RF channels and an uplink analog RF communications signal in one or more uplink analog RF channels.

Before discussing exemplary aspects of a transceiver circuit that includes specific aspects of the present disclosure, a brief overview of a conventional transceiver circuit is first provided in FIG. 2. The discussion of specific exemplary aspects of a transceiver circuit employing shared digital signal processing circuitry for communicating RF analog communications signals received by a remote unit in a WDS in multiple digital channels starts with reference to FIG. 3.

In this regard, FIG. 2 is a schematic diagram of an exemplary conventional transceiver circuit 200 for communicating a downlink analog RF communications signal 202D in one or more downlink analog RF channels 204(1)-204(M) and an uplink analog RF communications signal 202U in one or more uplink analog RF channels 206(1)-206(N). In a downlink path 208, the conventional transceiver circuit 200 includes downlink digital signal processing circuitry 210 and a downlink analog signal path 212. The downlink digital signal processing circuitry 210 receives a downlink digital communications signal 214D that occupies one or more downlink digital channels 216(1)-216(M). The downlink digital signal processing circuitry 210 includes a digital up-converter (DUC) 218 and a digital-to-analog converter (DAC) 220. The DUC 218 receives the downlink digital communications signal 214D and generates an intermediate downlink digital communications signal 222D in a selected downlink frequency (e.g., a downlink intermediate frequency (IF)). The DAC 220 converts the intermediate downlink digital communications signal 222D into a downlink analog communications signal 224D.

The downlink analog signal path 212 includes a downlink analog filter 226, an up-conversion circuit 228 and a downlink power amplifier 230. The downlink analog filter 226 is configured to pass required signal(s) (not shown) in the downlink analog communications signal 224D and attenuate other signal(s) (not shown). The up-conversion circuit 228 converts the downlink analog communications signal 224D into the downlink analog RF communications signal 202D. The downlink power amplifier 230 amplifies the downlink analog RF communications signal 202D to a specified downlink power level. The downlink analog RF communications signal 202D is provided to an antenna 232 via a coupling circuit 234 for distribution in the downlink analog RF channels 204(1)-204(M).

The downlink digital signal processing circuitry 210 has a predefined downlink digital signal processing bandwidth 236 (e.g., three hundred megahertz (300 MHz)). The downlink digital channels 216(1)-216(M) occupy a downlink digital spectrum 238. For the downlink digital signal processing circuitry 210 to correctly process the downlink digital communications signal 214D, the downlink digital spectrum 238 needs to be narrower than (e.g., less than or equal to) the predefined downlink digital signal processing bandwidth 236. The downlink analog RF channels 204(1)-204(M) occupy a downlink RF spectrum 240. The conventional transceiver circuit 200 is inherently capable of communicating the downlink analog RF communications signal 202D in the downlink analog RF channels 204(1)-204(M) when the downlink RF spectrum 240 is narrower than (e.g., less than or equal to) the predefined downlink digital signal processing bandwidth 236.

With continuing reference to FIG. 2, in an uplink path 242, the conventional transceiver circuit 200 includes an uplink analog signal path 244 and uplink digital signal processing circuitry 246. The uplink analog signal path 244 receives the uplink analog RF communications signal 202U in the uplink analog RF channels 206(1)-206(N) from the antenna 232 via the coupling circuit 234. The uplink analog signal path 244 includes a first uplink power amplifier 248 (e.g., a low-noise amplifier (LNA)), a down-conversion circuit 250, an uplink analog filter 252, and a second uplink power amplifier 254. The first uplink power amplifier 248 amplifies the uplink analog RF communications signal 202U to a specified uplink power level. The down-conversion circuit 250 converts the uplink analog RF communications signal 202U into an uplink analog communications signal 224U in selected uplink frequency (e.g., an uplink intermediate frequency (IF)). The uplink analog filter 252 is configured to pass required signal(s) in the uplink analog communications signal 224U and attenuate other signal(s). The second uplink power amplifier 254 further amplifies the uplink analog communications signal 224U before providing the uplink analog communications signal 224U to the uplink digital signal processing circuitry 246.

The uplink digital signal processing circuitry 246 includes an analog-to-digital converter (ADC) 256 and a digital down-converter (DDC) 258. The ADC 256 converts the uplink analog communications signal 224U into an intermediate uplink digital communications signal 222U. The DDC 258 converts the intermediate uplink digital communications signal 222U into an uplink digital communications signal 214U that includes one or more uplink digital channels 260(1)-260(N). In a non-limiting example, the downlink digital signal processing circuitry 210, the up-conversion circuit 228, the downlink power amplifier 230, the first uplink power amplifier 248, the down-conversion circuit 250, the second uplink power amplifier 254, and the uplink digital signal processing circuitry 246 are integrated into a transceiver integrated circuit (IC) 262.

The uplink digital signal processing circuitry 246 has a predefined uplink digital signal processing bandwidth 264 (e.g., 300 MHz). The uplink digital channels 260(1)-260(N) occupy an uplink digital spectrum 266. For the uplink digital signal processing circuitry 246 to correctly process the uplink digital communications signal 214U, the uplink digital spectrum 266 needs to be narrower than (e.g., less than or equal to) the predefined uplink digital signal processing bandwidth 264. The uplink analog RF channels 206(1)-206(N) occupy an uplink RF spectrum 268. The conventional transceiver circuit 200 is inherently capable of receiving the uplink analog RF communications signal 202U in the uplink analog RF channels 206(1)-206(N) when the uplink RF spectrum 268 is narrower than (e.g., less than or equal to) the predefined uplink digital signal processing bandwidth 264.

In some cases, the downlink analog RF channels 204(1)-204(M) may be more distanced from one another. For example, the downlink analog RF channel 204(1) may range from 746 MHz to 756 MHz, and the downlink analog RF channel 204(M) may range from 1985 MHz to 1990 MHz. In this regard, the downlink RF spectrum 240 occupied by the downlink analog RF channels 204(1), 204(M) is 1244 MHz (1990 MHz-746 MHz), which is wider than the predefined downlink digital signal processing bandwidth 236 (e.g., 300 MHz) of the downlink digital signal processing circuitry 210. As a result, the conventional transceiver circuit 200 will not be able to process and communicate the downlink analog RF communications signal 202D. Similarly, the conventional transceiver circuit 200 would not be able to process and communicate the uplink analog RF communications signal 202U when the uplink RF spectrum 268 exceeds the predefined uplink digital signal processing bandwidth 264.

One workable solution to above the bandwidth related issues is to include an additional transceiver IC (not shown) in the conventional transceiver circuit 200. However, adding the additional transceiver IC may significantly increase component costs and design complexity of the conventional transceiver circuit 200. Hence, it may be desirable to reconfigure the conventional transceiver circuit 200 to cope with the bandwidth related issues based on the transceiver IC 262, without adding the additional transceiver IC.

Figure 3:
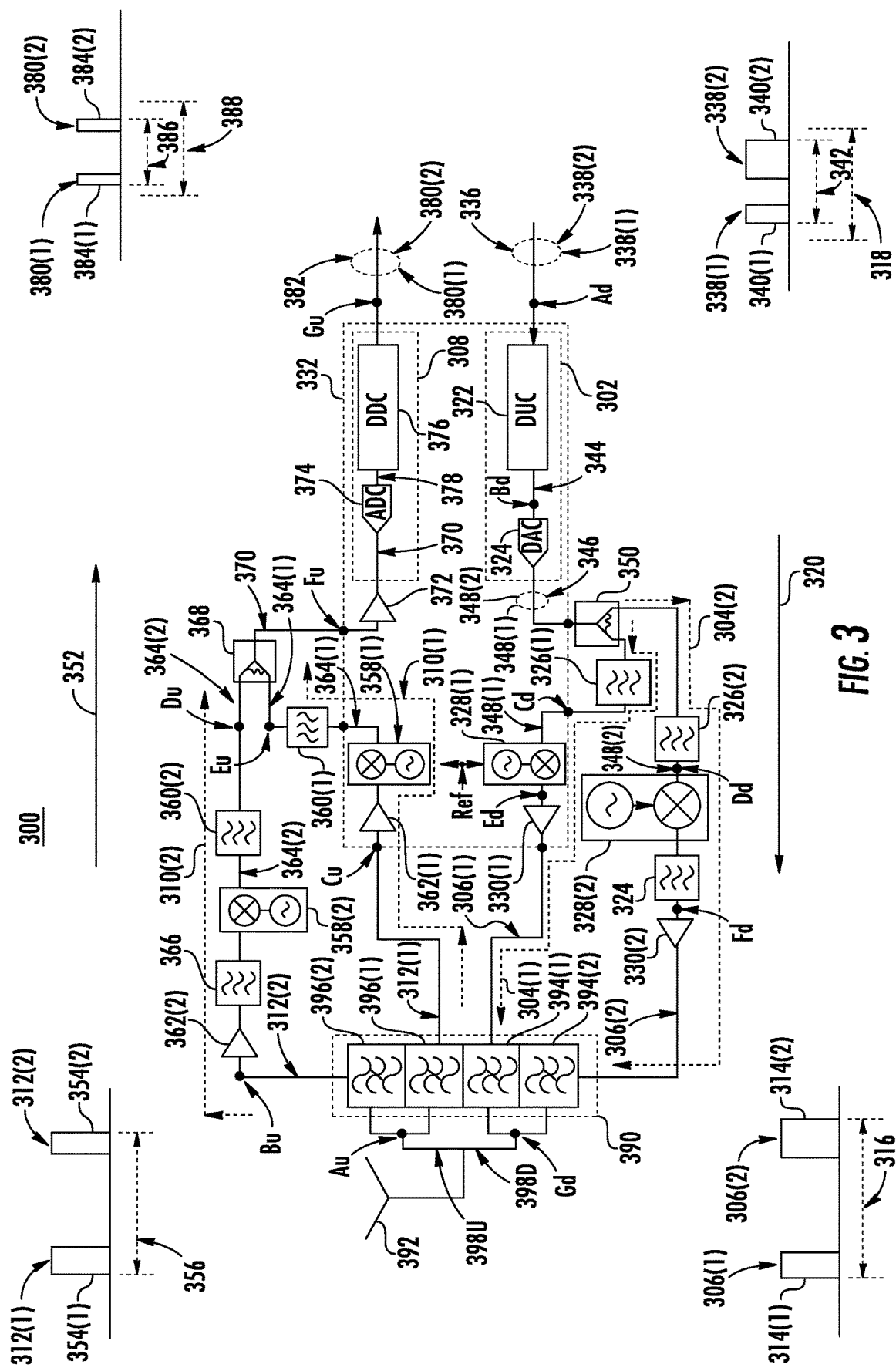
FIG. 3 is a schematic diagram of an exemplary transceiver circuit in which downlink digital signal processing circuitry is shared between a first downlink analog signal path and a second downlink analog signal path for communicating a first downlink analog RF communications signal and a second downlink analog RF communications signal, respectively, while uplink digital signal processing circuitry is shared between a first uplink analog signal path and a second uplink analog signal path for communicating a first uplink analog RF communications signal and a second uplink analog RF communications signal, respectively.

In this regard, FIG. 3 is a schematic diagram of an exemplary transceiver circuit 300 in which downlink digital signal processing circuitry 302 is shared between a first downlink analog signal path 304(1) and a second downlink analog signal path 304(2) for communicating a first downlink analog RF communications signal 306(1) and a second downlink analog RF communications signal 306(2), respectively, while uplink digital signal processing circuitry 308 is shared between a first uplink analog signal path 310(1) and a second uplink analog signal path 310(2) for communicating a first uplink analog RF communications signal 312(1) and a second uplink analog RF communications signal 312(2), respectively. Although the transceiver circuit 300 is shown to include only the first downlink analog signal path 304(1) and the second downlink analog signal path 304(2), it shall be appreciated that the downlink digital signal processing circuitry 302 may support additional downlink analog signal path(s). Likewise, the uplink digital signal processing circuitry 308 may support additional uplink analog signal path(s), as well. An exemplary illustration of supporting additional downlink analog signal path(s) by the downlink digital signal processing circuitry 302 and/or supporting additional uplink analog signal path(s) by the uplink digital signal processing circuitry 308 is provided later in FIG. 8.

With reference to FIG. 3, the first downlink analog RF communications signal 306(1) and the second downlink analog RF communications signal 306(2) are communicated in a first downlink analog RF channel 314(1) and a second downlink analog RF channel 314(2), respectively. The first downlink analog RF channel 314(1) and the second downlink analog RF channel 314(2) occupy a downlink RF spectrum 316.

The downlink digital signal processing circuitry 302 is configured to digitally analyze and process the first downlink analog RF communications signal 306(1) and the second downlink analog RF communications signal 306(2) based on digital samples (not shown) representing the first downlink analog RF communications signal 306(1) and the second downlink analog RF communications signal 306(2). The digitally processed digital samples are then used to construct the first downlink analog RF communications signal 306(1) and the second downlink analog RF communications signal 306(2) via digital-to-analog conversion. The downlink digital signal processing circuitry 302 has a predefined downlink digital signal processing bandwidth 318, which may be 300 MHz, for example. The predefined downlink digital signal processing bandwidth 318 determines the ability of the downlink digital signal processing circuitry 302 in processing the digital samples. The predefined downlink digital signal processing bandwidth 318 also determines whether the downlink digital signal processing circuitry 302 can correctly construct the first downlink analog RF communications signal 306(1) and the second downlink analog RF communications signal 306(2) based on the digital samples. In this regard, the downlink digital signal processing circuitry 302 is inherently capable of constructing the first downlink analog RF communications signal 306(1) and the second downlink analog RF communications signal 306(2) if the downlink RF spectrum 316 is narrower than (e.g., less than or equal to) the predefined downlink digital signal processing bandwidth 318.

In a non-limiting example, the first downlink analog RF communications signal 306(1) and the second downlink analog RF communications signal 306(2) are long-term evolution (LTE) communications signals. As such, the first downlink analog RF channel 314(1) and the second downlink analog RF channel 314(2) may be distanced from one another. For example, the first downlink analog RF channel 314(1) is in a frequency spectrum ranging from 746 MHz to 756 MHz, and the second downlink analog RF channel 314(2) is in a frequency spectrum ranging from 1985 MHz to 1990 MHz. Accordingly, the downlink RF spectrum 316 occupied by the first downlink analog RF channel 314(1) and the second downlink analog RF channel 314(2) is 1244 MHz (1990 MHz-746 MHz). In this regard, the downlink RF spectrum 316 occupied by the first downlink analog RF channel 314(1) and the second downlink analog RF channel 314(2) is wider than (e.g., greater than) the predefined downlink digital signal processing bandwidth 318. As a result, the downlink digital signal processing circuitry 302 may not be able to construct the first downlink analog RF communications signal 306(1) and the second downlink analog RF communications signal 306(2) correctly. In this regard, as further discussed next, it may be possible to configure the transceiver circuit 300 to support the first downlink analog RF channel 314(1) and the second downlink analog RF channel 314(2) in the downlink RF spectrum 316 by sharing the downlink digital signal processing circuitry 302 between the first downlink analog signal path 304(1) and the second downlink analog signal path 304(2).

With continuing reference to FIG. 3, a downlink path 320 includes the downlink digital signal processing circuitry 302, the first downlink analog signal path 304(1), and the second downlink analog signal path 304(2). The downlink digital signal processing circuitry 302 includes a DUC 322 and a DAC 324. The first downlink analog signal path 304(1) includes a first downlink analog filter 326(1) and a first up-conversion circuit 328(1). The first downlink analog signal path 304(1) may also include a first downlink power amplifier 330(1). In a non-limiting example, the downlink digital signal processing circuitry 302, the first up-conversion circuit 328(1), and the first downlink power amplifier 330(1) are packaged in a transceiver IC 332, which may be an off-the-shelf transceiver IC. In this regard, the transceiver IC 332 can be configured to provide the first downlink analog signal path 304(1) by coupling the first downlink analog filter 326(1) to the first up-conversion circuit 328(1).

The second downlink analog signal path 304(2) includes a second downlink analog filter 326(2), a second up-conversion circuit 328(2), and a secondary downlink analog filter 334. The second downlink analog signal path 304(2) may also include a second downlink power amplifier 330(2). Analog components, such as the first downlink analog filter 326(1), the first up-conversion circuit 328(1), and the first up-conversion circuit 328(1), are generally less expensive compared to digital components like the DUC 322 and the DAC 324. As such, by sharing the downlink digital signal processing circuitry 302 between the first downlink analog signal path 304(1) and the second downlink analog signal path 304(2), it may be possible to reduce component costs for the transceiver circuit 300, compared to adding an additional transceiver IC into the transceiver circuit 300.

With continuing reference to FIG. 3, the DUC 322 receives a downlink digital communications signal 336. In a non-limiting example the downlink digital communications signal 336 includes a first downlink digital baseband signal 338(1) and a second downlink digital baseband signal 338(2). The first downlink digital baseband signal 338(1) corresponds to a first downlink digital channel 340(1). The second downlink digital baseband signal 338(2) corresponds to a second downlink digital channel 340(2). The first downlink digital channel 340(1) and the second downlink digital channel 340(2) occupy a downlink digital spectrum 342 that is narrower than (e.g., less than or equal to) the predefined downlink digital signal processing bandwidth 318.

The DUC 322 up-converts the downlink digital communications signal 336 to generate an intermediate downlink digital communications signal 344. In the intermediate downlink digital communications signal 344, the first downlink digital baseband signal 338(1) and the second downlink digital baseband signal 338(2) are shifted to a first selected downlink frequency and a second selected downlink frequency, respectively. In a non-limiting example, the first selected downlink frequency and the second selected downlink frequency are intermediate frequencies (IFs) higher than a baseband frequency occupied by the first downlink digital baseband signal 338(1) and the second downlink digital baseband signal 338(2). The DAC 324 receives and converts the intermediate downlink digital communications signal 344 into a downlink analog communications signal 346. The downlink analog communications signal 346 includes a first downlink analog signal 348(1) and a second downlink analog signal 348(2). The first downlink analog signal 348(1) is located at the first selected downlink frequency, and the second downlink analog signal 348(2) is located in the second selected downlink frequency. In a non-limiting example, the first downlink analog signal 348(1) and the second downlink analog signal 348(2) correspond to the first downlink digital baseband signal 338(1) and the second downlink digital baseband signal 338(2), respectively.

The transceiver circuit 300 also includes a downlink signal splitter 350. In a non-limiting example, the downlink signal splitter 350 is coupled to the DAC 324 to receive the downlink analog communications signal 346. The downlink signal splitter 350 provides the downlink analog communications signal 346 to the first downlink analog signal path 304(1) and the second downlink analog signal path 304(2). In this regard, both the first downlink analog signal path 304(1) and the second downlink analog signal path 304(2) receive the downlink analog communications signal 346 that includes the first downlink analog signal 348(1) and the second downlink analog signal 348(2).

The first downlink analog filter 326(1) receives the downlink analog communications signal 346 from the downlink signal splitter 350. In a non-limiting example, the first downlink analog filter 326(1) is a band-pass filter configured to output the first downlink analog signal 348(1) while blocking the second downlink analog signal 348(2). The first up-conversion circuit 328(1) receives and converts the first downlink analog signal 348(1) into the first downlink analog RF communications signal 306(1) for communication in the first downlink analog RF channel 314(1). The first downlink power amplifier 330(1) may amplify the first downlink analog RF communications signal 306(1) to a first specified downlink power level.

The second downlink analog filter 326(2) receives the downlink analog communications signal 346 from the downlink signal splitter 350. In a non-limiting example, the second downlink analog filter 326(2) is a band-pass filter configured to output the second downlink analog signal 348(2) while blocking the first downlink analog signal 348(1). The second up-conversion circuit 328(2) receives and converts the second downlink analog signal 348(2) into the second downlink analog RF communications signal 306(2) for communication in the second downlink analog RF channel 314(2). In a non-limiting example, the second up-conversion circuit 328(2) is a low-cost up-conversion circuit, which may introduce noise into the second downlink analog RF communications signal 306(2). As such, the secondary downlink analog filter 334 may be provided in the second downlink analog signal path 304(2) to attenuate unwanted RF elements (e.g., noise) in the second downlink analog RF communications signal 306(2). The second downlink power amplifier 330(2) may amplify the second downlink analog RF communications signal 306(2) to a second specified downlink power level.

Figure 4:
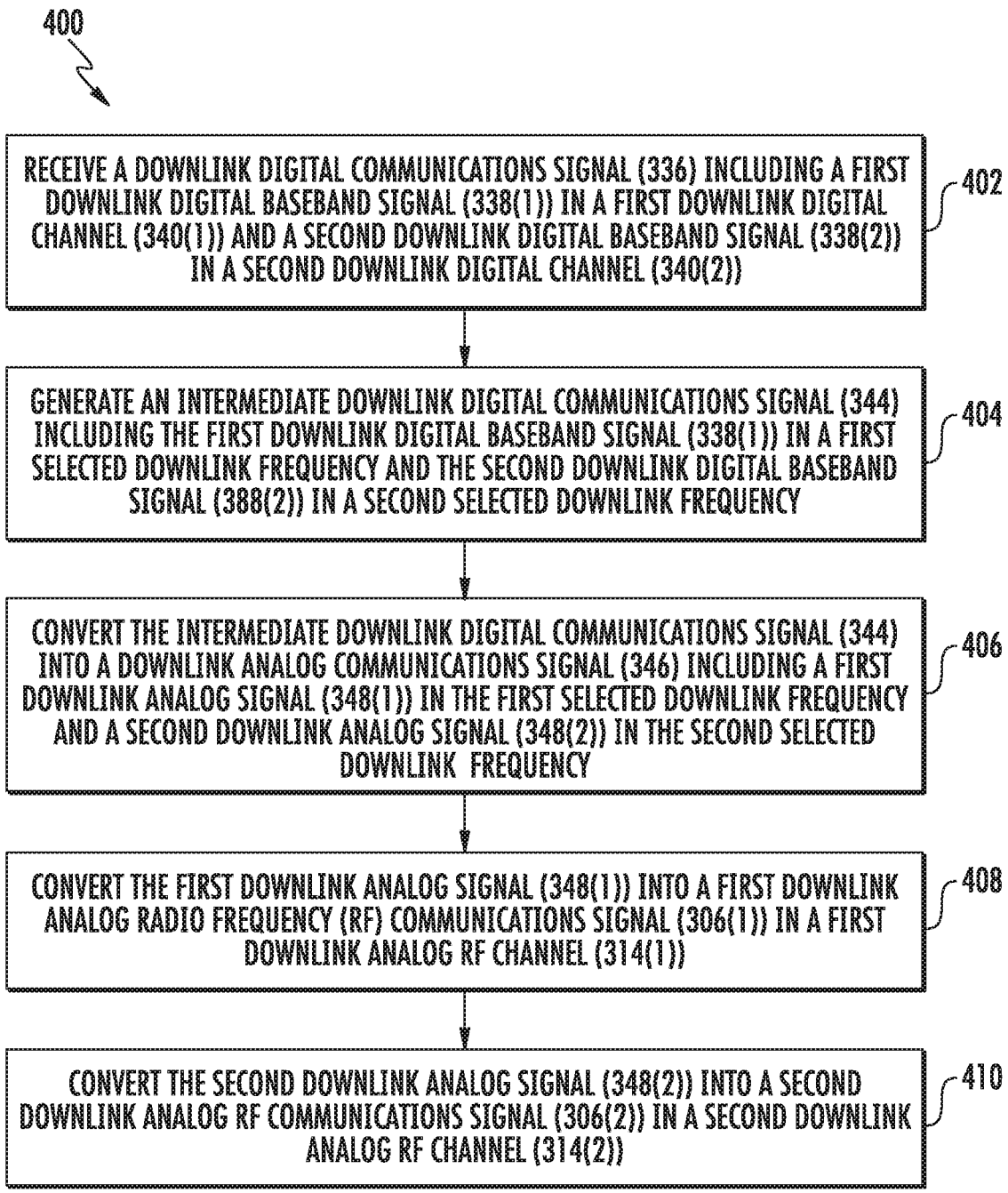
FIG. 4 is a flowchart of an exemplary process of the transceiver circuit of FIG. 3 for communicating the first downlink analog RF communications signal and the second downlink analog RF communications signal by sharing the downlink digital signal processing circuitry.

The transceiver circuit 300 is configured to communicate the first downlink analog RF communications signal 306(1) and the second downlink analog RF communications signal 306(2) according to a process. In this regard, FIG. 4 is a flowchart of an exemplary process 400 of the transceiver circuit 300 for communicating the first downlink analog RF communications signal 306(1) and the second downlink analog RF communications signal 306(2) by sharing the downlink digital signal processing circuitry 302. The discussion of the exemplary process 400 in FIG. 4 is in reference to the transceiver circuit 300 in FIG. 3.

With reference to FIG. 4, the downlink digital signal processing circuitry 302 receives the downlink digital communications signal 336 including the first downlink digital baseband signal 338(1) in the first downlink digital channel 340(1) and the second downlink digital baseband signal 338(2) in the second downlink digital channel 340(2) (block 402). The DUC 322 generates the intermediate downlink digital communications signal 344 including the first downlink digital baseband signal 338(1) in the first selected downlink frequency and the second downlink digital baseband signal 338(2) in the second selected downlink frequency (block 404). The DAC 324 converts the intermediate downlink digital communications signal 344 into the downlink analog communications signal 346 including the first downlink analog signal 348(1) in the first selected downlink frequency and the second downlink analog signal 348(2) in the second selected downlink frequency (block 406). The first downlink analog signal path 304(1) converts the first downlink analog signal 348(1) into the first downlink analog RF communications signal 306(1) in the first downlink analog RF channel 314(1) (block 408). The second downlink analog signal path 304(2) converts the second downlink analog signal 348(2) into the second downlink analog RF communications signal 306(2) in the second downlink analog RF channel 314(2) (block 410).

With reference back to FIG. 3, an uplink path 352 includes the first uplink analog signal path 310(1), the second uplink analog signal path 310(2), and the uplink digital signal processing circuitry 308. The first uplink analog signal path 310(1) receives the first uplink analog RF communications signal 312(1) in a first uplink analog RF channel 354(1). The second uplink analog signal path 310(2) receives the second uplink analog RF communications signal 312(2) in a second uplink analog RF channel 354(2). The first uplink analog RF channel 354(1) and the second uplink analog RF channel 354(2) occupy an uplink RF spectrum 356.

The first uplink analog signal path 310(1) includes a first down-conversion circuit 358(1) and a first uplink analog filter 360(1). The first uplink analog signal path 310(1) may also include a first uplink power amplifier 362(1) (e.g., a low-noise amplifier (LNA)). The first down-conversion circuit 358(1) converts the first uplink analog RF communications signal 312(1) into a first uplink analog signal 364(1) in a first selected uplink frequency. The first uplink analog filter 360(1) receives and outputs the first uplink analog signal 364(1). The first uplink power amplifier 362(1) may amplify the first uplink analog RF communications signal 312(1) to a first specified uplink power level before providing the first uplink analog RF communications signal 312(1) to the first down-conversion circuit 358(1).

The second uplink analog signal path 310(2) includes a second down-conversion circuit 358(2) and a second uplink analog filter 360(2). The second down-conversion circuit 358(2) converts the second uplink analog RF communications signal 312(2) into a second uplink analog signal 364(2) in a second selected uplink frequency. In a non-limiting example, the second down-conversion circuit 358(2) is a low-cost down-conversion circuit. As such, a secondary uplink analog filter 366 may be included in the second uplink analog signal path 310(2) to attenuate unwanted RF elements (e.g., noise) before down-converting the second uplink analog RF communications signal 312(2). The second uplink analog filter 360(2) receives and outputs the second uplink analog signal 364(2). The second uplink analog signal path 310(2) may also include a second uplink power amplifier 362(2) (e.g., a LNA). The second uplink power amplifier 362(2) may amplify the second uplink analog RF communications signal 312(2) to a second specified uplink power level before providing the second uplink analog RF communications signal 312(2) to the secondary uplink analog filter 366. In a non-limiting example the first selected uplink frequency and the second selected uplink frequency are IFs that are lower than frequencies occupied by the first uplink analog RF channel 354(1) and the second uplink analog RF channel 354(2).

The transceiver circuit 300 also includes a signal combiner 368 that couples the first uplink analog signal path 310(1) and the second uplink analog signal path 310(2) to the uplink digital signal processing circuitry 308. The signal combiner 368 receives the first uplink analog signal 364(1) and the second uplink analog signal 364(2) from the first uplink analog filter 360(1) and the second uplink analog filter 360(2), respectively. Accordingly, the signal combiner 368 generates an uplink analog communications signal 370 that includes the first uplink analog signal 364(1) in the first selected uplink frequency and the second uplink analog signal 364(2) in the second selected uplink frequency. A secondary uplink power amplifier 372 may be employed to amplify the uplink analog communications signal 370 before providing the uplink analog communications signal 370 to the uplink digital signal processing circuitry 308.

With continuing reference to FIG. 3, the uplink digital signal processing circuitry 308 includes an ADC 374 and a DDC 376. The ADC 374 receives the uplink analog communications signal 370 and converts the uplink analog communications signal 370 into an intermediate uplink digital communications signal 378. The intermediate uplink digital communications signal 378 includes a first uplink digital baseband signal 380(1) in the first selected uplink frequency and a second uplink digital baseband signal 380(2) in the second selected uplink frequency. In a non-limiting example, the first uplink digital baseband signal 380(1) and the second uplink digital baseband signal 380(2) correspond respectively to the first uplink analog signal 364(1) and the second uplink analog signal 364(2). The DDC 376 receives the intermediate uplink digital communications signal 378 and generates an uplink digital communications signal 382. The uplink digital communications signal 382 includes the first uplink digital baseband signal 380(1) in a first uplink digital channel 384(1) and the second uplink digital baseband signal 380(2) in a second uplink digital channel 384(2). In a non-limiting example, the first uplink digital channel 384(1) and the second uplink digital channel 384(2) are located at digital baseband frequencies lower than the first selected uplink frequency and the second selected uplink frequency.

The first uplink digital channel 384(1) and the second uplink digital channel 384(2) occupy a uplink digital spectrum 386 that is narrower (e.g., less than or equal to) than a predefined uplink digital signal processing bandwidth 388 of the uplink digital signal processing circuitry 308. By sharing the uplink digital signal processing circuitry 308 between the first uplink analog signal path 310(1) and the second uplink analog signal path 310(2), the transceiver circuit 300 is capable of processing the first uplink analog RF communications signal 312(1) and the second uplink analog RF communications signal 312(2) even if the uplink RF spectrum 356 is wider than the predefined uplink digital signal processing bandwidth 388.

The transceiver circuit 300 also includes a coupling circuit 390 coupled to an antenna 392. The coupling circuit 390 includes a first downlink coupler 394(1), a second downlink coupler 394(2), a first uplink coupler 396(1), and a second uplink coupler 396(2). The first downlink coupler 394(1) and the second downlink coupler 394(2) are coupled to the first downlink analog signal path 304(1) and the second downlink analog signal path 304(2), respectively. Together, the first downlink coupler 394(1) and the second downlink coupler 394(2) generate a downlink analog RF communications signal 398D that includes the first downlink analog RF communications signal 306(1) and the second downlink analog RF communications signal 306(2). The downlink analog RF communications signal 398D is distributed through the antenna 392. The first uplink coupler 396(1) and the second uplink coupler 396(2) are coupled to the first uplink analog signal path 310(1) and the second uplink analog signal path 310(2), respectively. Together, the first uplink coupler 396(1) and the second uplink coupler 396(2) receive an uplink analog RF communications signal 398U via the antenna 392. The uplink analog RF communications signal 398U includes the first uplink analog RF communications signal 312(1) and the second uplink analog RF communications signal 312(2). The first uplink coupler 396(1) provides the first uplink analog RF communications signal 312(1) to the first uplink analog signal path 310(1). The second uplink coupler 396(2) provides the second uplink analog RF communications signal 312(2) to the second uplink analog signal path 310(2).

The downlink digital communications signal 336 progresses through a plurality of downlink spectrum conversion points Ad, Bd, Cd, Dd, Ed, Fd, and Gd along the downlink path 320 before being converted into the downlink analog RF communications signal 398D. Similarly, the uplink analog RF communications signal 398U progresses through a plurality of uplink spectrum conversion points Au, Bu, Cu, Du, Eu, Fu, and Gu before being converted into the uplink digital communications signal 382.

Figure 5A:
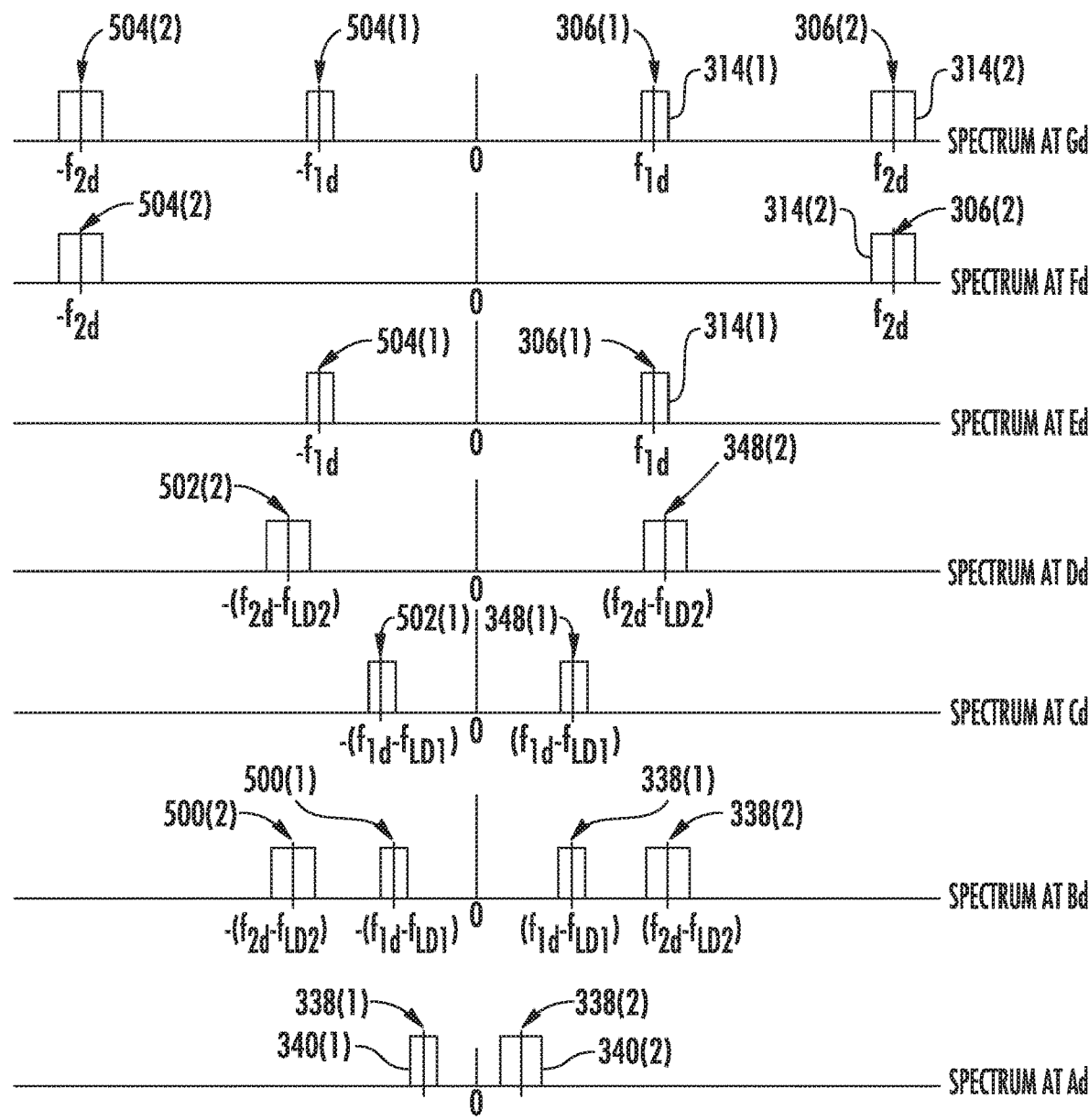
FIG. 5A is a schematic diagram providing an exemplary illustration of downlink spectrum conversion occurring at a plurality of downlink spectrum conversion points along a downlink path in the transceiver circuit of FIG. 3.

To help understand the downlink spectrum conversion occurring at each of the downlink spectrum conversion points Ad, Bd, Cd, Dd, Ed, Fd, and Gd along the downlink path 320, FIG. 5A is discussed next. In this regard, FIG. 5A is a schematic diagram providing an exemplary illustration of downlink spectrum conversion occurring at the downlink spectrum conversion points Ad, Bd, Cd, Dd, Ed, Fd, and Gd along the downlink path 320 in the transceiver circuit 300 of FIG. 3. Common elements between FIGS. 3 and 5A are shown therein with common element numbers and will not be re-described herein.

With reference to FIG. 5A, at the downlink spectrum conversion point Ad, the first downlink digital baseband signal 338(1) and the second downlink digital baseband signal 338(2) are associated with the first downlink digital channel 340(1) and the second downlink digital channel 340(2), respectively. At the downlink spectrum conversion point Bd, the first downlink digital baseband signal 338(1) and the second downlink digital baseband signal 338(2) are centered at frequency $(f_{1d}-f_{LD1})$ and frequency $(f_{2d}-f_{LD2})$, respectively. In this regard, the frequency $(f_{1d}-f_{LD1})$ and the frequency $(f_{2d}-f_{LD2})$ correspond respectively to the first selected downlink frequency and the second selected downlink frequency of FIG. 3. While up-shifting the first downlink digital baseband signal 338(1) and the second downlink digital baseband signal 338(2) to the frequency $f_{1d}-f_{LD1}$ and the frequency $f_{2d}-f_{LD2}$, the DUC 322 also creates a mirrored first downlink digital baseband signal 500(1) and a mirrored second downlink digital baseband signal 500(2) at frequency $-(f_{1d}-f_{LD1})$ and frequency $-(f_{2d}-f_{LD2})$, respectively. In a non-limiting example, the frequencies $f_{1d}$, $f_{LD1}$, $f_{2d}$, and $f_{LD2}$ are centered at 878 MHz (e.g., cell band 32 MHz), 778 MHz (e.g., lo cell band 32 MHz), 1962.5 MHz (e.g., personal communications system (PCS) band 65 MHz), and 1762.5 MHz (lo PCS band 65 MHz), respectively. Accordingly, the frequency $(f_{1d}-f_{LD1})$ and the frequency $(f_{2d}-f_{LD2})$ are 100 MHz and 200 MHz, respectively At the downlink spectrum conversion point Cd, the first downlink analog signal 348(1) passes through the first downlink analog filter 326(1) in the first downlink analog signal path 304(1). The first downlink analog signal 348(1) centers at the frequency $(f_{1d}-f_{LD1})$, corresponding to the first selected downlink frequency. While passing the first downlink analog signal 348(1), the first downlink analog filter 326(1) creates a mirrored first downlink analog signal 502(1) at the frequency $-(f_{1d}-f_{LD1})$. At the downlink spectrum conversion point Dd, the second downlink analog signal 348(2) passes through the second downlink analog filter 326(2) in the second downlink analog signal path 304(2). The second downlink analog signal 348(2) centers at the frequency $(f_{2d}-f_{LD2})$, corresponding to the second selected downlink frequency. While passing the second downlink analog signal 348(2), the second downlink analog filter 326(2) creates a mirrored second downlink analog signal 502(2) at the frequency $-(f_{2d}-f_{LD2})$.

At the downlink spectrum conversion point Ed, the first up-conversion circuit 328(1) converts the first downlink analog signal 348(1) into the first downlink analog RF communications signal 306(1). The first downlink analog RF communications signal 306(1) occupies the first downlink analog RF channel 314(1), which centers at frequency $f_{1d}$. While generating the first downlink analog RF communications signal 306(1), the first up-conversion circuit 328(1) also creates a mirrored first downlink analog RF communications signal 504(1), which centers at frequency $-f_{1d}$. At the downlink spectrum conversion point Fd, the second up-conversion circuit 328(2) converts the second downlink analog signal 348(2) into the second downlink analog RF communications signal 306(2). The second downlink analog RF communications signal 306(2) occupies the second downlink analog RF channel 314(2), which centers at frequency $f_{2d}$. While generating the second downlink analog RF communications signal 306(2), the second up-conversion circuit 328(2) also creates a mirrored second downlink analog RF communications signal 504(2), which centers at frequency $-f_{2d}$.

At the downlink spectrum conversion point Gd, the first downlink coupler 394(1) and the second downlink coupler 394(2) generate the downlink analog RF communications signal 398D. The downlink analog RF communications signal 398D includes the first downlink analog RF communications signal 306(1), the second downlink analog RF communications signal 306(2), the mirrored first downlink analog RF communications signal 504(1), and the mirrored second downlink analog RF communications signal 504(2).

Figure 5B:
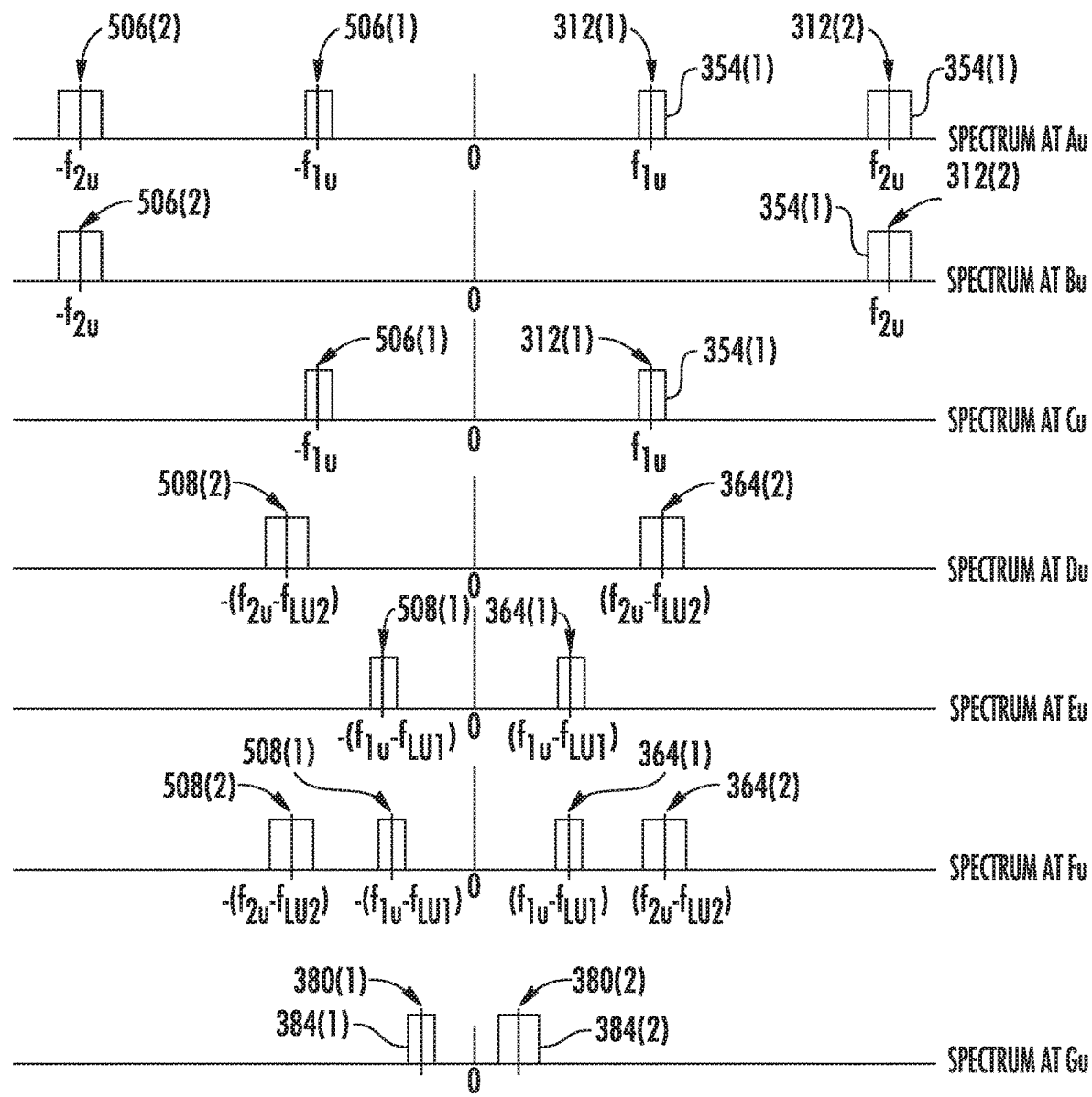
FIG. 5B is a schematic diagram providing an exemplary illustration of uplink spectrum conversion occurring at a plurality of uplink spectrum conversion points along an uplink path in the transceiver circuit of FIG. 3.

To help understand the uplink spectrum conversion occurring at each of the uplink spectrum conversion points Au, Bu, Cu, Du, Eu, Fu, and Gu along the uplink path 352 of FIG. 3, FIG. 5B is discussed next. In this regard, FIG. 5B is a schematic diagram providing an exemplary illustration of uplink spectrum conversion occurring at the uplink spectrum conversion points Au, Bu, Cu, Du, Eu, Fu, and Gu along the uplink path 352 in the transceiver circuit 300 of FIG. 3.

Common elements between FIGS. 3 and 5B are shown therein with common element numbers and will not be re-described herein.

With reference to FIG. 5B, at the uplink spectrum conversion point Au, the uplink analog RF communications signal 398U is received. The uplink analog RF communications signal 398U includes the first uplink analog RF communications signal 312(1) and the second uplink analog RF communications signal 312(2). The first uplink analog RF communications signal 312(1) is in the first uplink analog RF channel 354(1), which centers at frequency $f_{1u}$. The second uplink analog RF communications signal 312(2) is in the second uplink analog RF channel 354(2), which centers at frequency $f_{2u}$. The uplink analog RF communications signal 398U also includes a mirrored first uplink analog RF communications signal 506(1) and a mirrored second uplink analog RF communications signal 506(2). The mirrored first uplink analog RF communications signal 506(1) and the mirrored second uplink analog RF communications signal 506(2) are centered at frequency $-f_{1u}$ and frequency $-f_{2u}$, respectively.

At the uplink spectrum conversion point Bu, the second uplink coupler 396(2) provides the second uplink analog RF communications signal 312(2) and the mirrored second uplink analog RF communications signal 506(2) to the second uplink analog signal path 310(2). The second uplink analog RF communications signal 312(2) remains in the second uplink analog RF channel 354(2) centering at the frequency $f_{2u}$. At the uplink spectrum conversion point Cu, the first uplink coupler 396(2) provides the first uplink analog RF communications signal 312(1) and the mirrored first uplink analog RF communications signal 506(1) to the first uplink analog signal path 310(1). The first uplink analog RF communications signal 312(1) remains in the first uplink analog RF channel 354(1) centering at the frequency $f_{1u}$.

At the uplink spectrum conversion point Du, the second uplink analog filter 360(2) outputs the second uplink analog signal 364(2), centering at frequency $(f_{2u}-f_{LU2})$. In a non-limiting example, the frequency $(f_{2u}-f_{LU2})$ corresponds to the second selected uplink frequency of FIG. 3. The second uplink analog filter 360(2) also outputs a mirrored second uplink analog signal 508(2), centering at frequency $-(f_{2u}-f_{LU2})$. At the uplink spectrum conversion point Eu, the first uplink analog filter 360(1) outputs the first uplink analog signal 364(1), centering at frequency $(f_{1u}-f_{LU1})$. In a non-limiting example, the frequency $(f_{1u}-f_{LU1})$ corresponds to the first selected uplink frequency of FIG. 3. The first uplink analog filter 360(1) also outputs a mirrored first uplink analog signal 508(1), centering at frequency $-(f_{1u}-f_{LU1})$. In a non-limiting example, the frequencies $f_{1u}$, $f_{LU1}$, $f_{2u}$, and $f_{LU2}$ are centered at 833 MHz (e.g., cell band 32 MHz), 783 MHz (e.g., lo cell band 10 MHz), 1882.5 MHz (e.g., PCS band 65 MHz), and 1732.5 MHz (lo PCS band 10 MHz), respectively. Accordingly, frequency $(f_{1u}-f_{LU1})$ and frequency $(f_{2u}-f_{LU2})$ are 50 MHz and 150 MHz, respectively.

At the uplink spectrum conversion point Fu, the signal combiner 368 outputs the uplink analog communications signal 370 that includes the first uplink analog signal 364(1), the second uplink analog signal 364(2), the mirrored first uplink analog signal 508(1), and the mirrored second uplink analog signal 508(2). At the uplink conversion point Gu, the DDC 376 generates the first uplink digital baseband signal 380(1) in the first uplink digital channel 384(1) and the second uplink digital baseband signal 380(2) in the second uplink digital channel 384(2).

Figure 6:
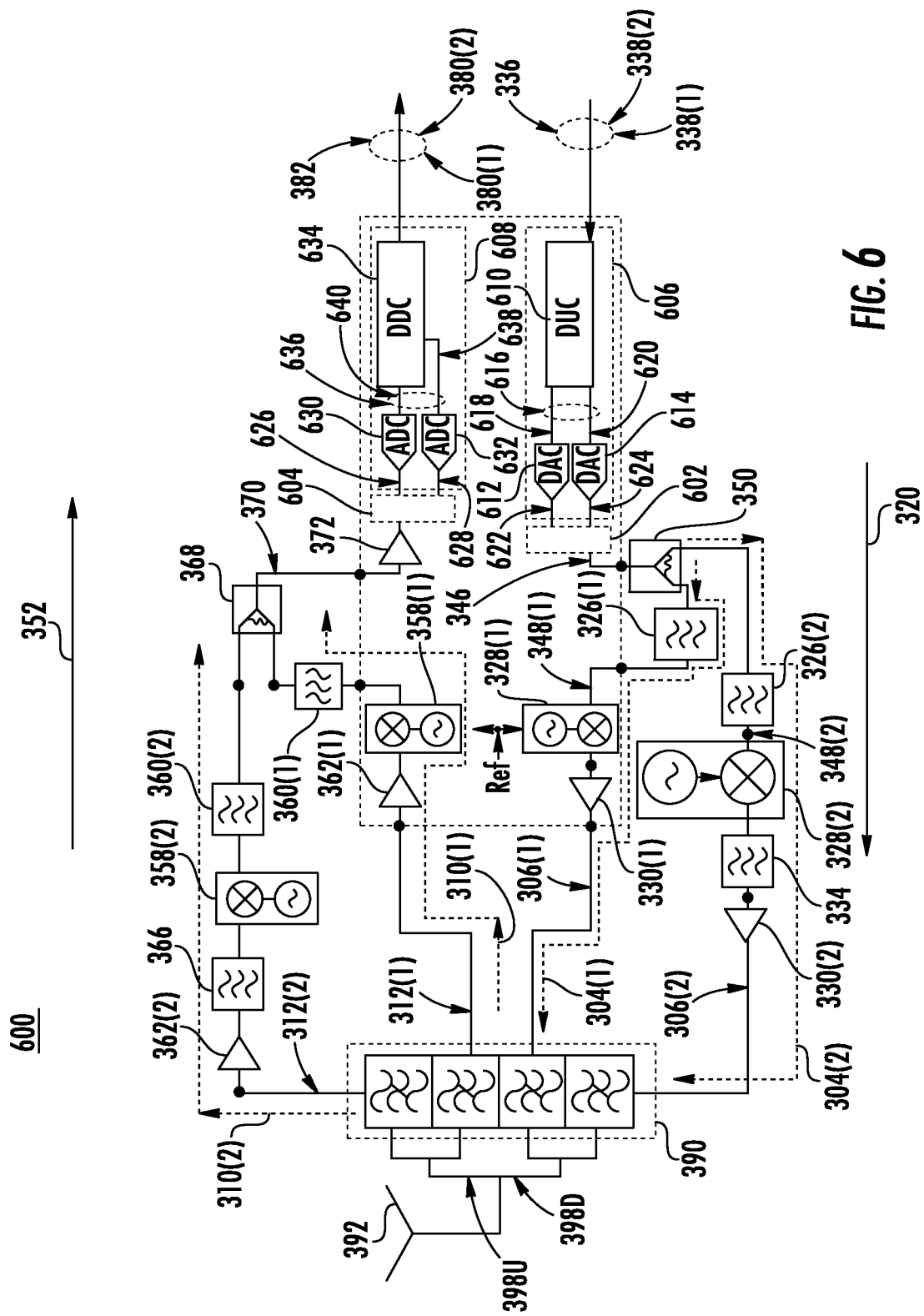
FIG. 6 is a schematic diagram of an exemplary transceiver circuit including a downlink in-phase (I)/quadrature (Q) (I/Q) mixer and an uplink I/Q mixer for respectively processing downlink I/Q elements and uplink I/Q elements in the transceiver circuit.

With reference back to FIG. 3, in a non-limiting example, the DUC 322 is configured to generate the intermediate downlink digital communications signal 344 including a downlink in-phase (I) element (I-element) and a downlink quadrature (Q) element (Q-element). Likewise, the DDC 376 is configured to receive the intermediate uplink digital communications signal 378 including an uplink I-element and an uplink Q-element. In this regard, FIG. 6 is a schematic diagram of an exemplary transceiver circuit 600 including a downlink I/Q mixer 602 and uplink I/Q mixer 604 for processing downlink I/Q elements and uplink I/Q elements, respectively, in the transceiver circuit 600. Common elements between FIGS. 3 and 6 are shown therein with common element numbers and will not be re-described herein.

With reference to FIG. 6, the transceiver circuit 600 includes downlink digital signal processing circuitry 606 and uplink digital signal processing circuitry 608. The downlink digital signal processing circuitry 606 includes a DUC 610, an I-element DAC 612, and a Q-element DAC 614. The DUC 610 generates an intermediate downlink digital communications signal 616 including a downlink digital I-element 618 and a downlink digital Q-element 620. The I-element DAC 612 receives the downlink digital I-element 618 and converts the downlink digital I-element 618 into a downlink analog I-element signal 622. The Q-element DAC 614 receives the downlink digital Q-element 620 and converts the downlink digital Q-element 620 into a downlink analog Q-element signal 624. The downlink I/Q mixer 602 receives the downlink analog I-element signal 622 and the downlink analog Q-element signal 624 from the I-element DAC 612 and the Q-element DAC 614, respectively. The downlink I/Q mixer 602 generates the downlink analog communications signal 346 based on the downlink analog I-element signal 622 and the downlink analog Q-element signal 624.

Figure 7A:
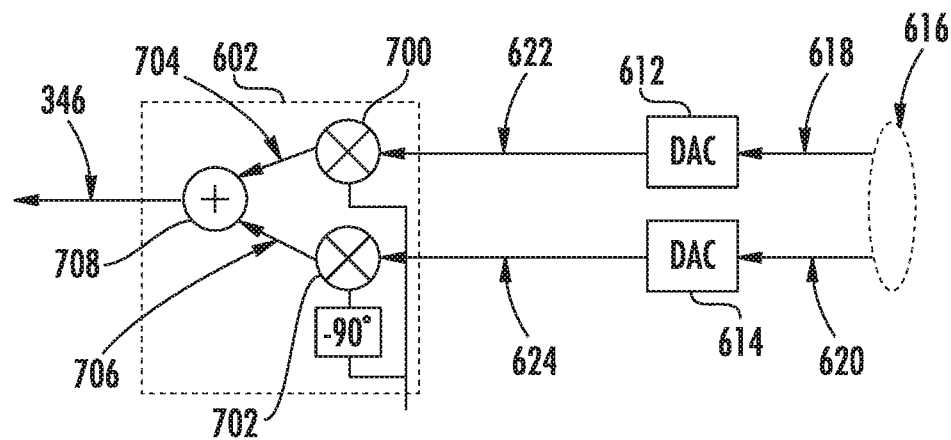
FIG. 7A is a schematic diagram providing an exemplary illustration of the downlink I/Q mixer of FIG. 6 for processing downlink I/Q elements.

The downlink I/Q mixer 602 is illustrated and discussed next with reference to FIG. 7A. In this regard, FIG. 7A is a schematic diagram providing an exemplary illustration of the downlink I/Q mixer 602 of FIG. 6 for processing downlink I/Q elements. Common elements between FIGS. 6 and 7A are shown therein with common element numbers and will not be re-described herein.

With reference to FIG. 7A, the downlink I/Q mixer 602 includes an I-element signal modulator 700 and a Q-element signal modulator 702. The I-element signal modulator 700 receives the downlink analog I-element signal 622 and generates a modulated analog I-element signal 704. The Q-element signal modulator 702 receives the downlink analog Q-element signal 624 and generates a modulated analog Q-element signal 706. The modulated analog Q-element signal 706 is at a negative ninety-degree (−90°) phase offset from the modulated analog I-element signal 704. The downlink I/Q mixer 602 includes a mixer 708 configured to mix the modulated analog I-element signal 704 and the modulated analog Q-element signal 706 to generate the downlink analog communications signal 346.

With reference back to FIG. 6, the uplink I/Q mixer 604 receives the uplink analog communications signal 370. The uplink I/Q mixer 604 generates an uplink analog I-element signal 626 and an uplink analog Q-element signal 628 based on the uplink analog communications signal 370. The uplink digital signal processing circuitry 608 includes an I-element ADC 630, a Q-element ADC 632, and a DDC 634. The I-element ADC 630 receives the uplink analog I-element signal 626 and generates an uplink I-element 636. The Q-element ADC 632 receives the uplink analog Q-element signal 628 and generates an uplink Q-element 638. The uplink I-element 636 and the uplink Q-element 638 are provided to the DDC 634 in an intermediate uplink digital communications signal 640.

Figure 7B:
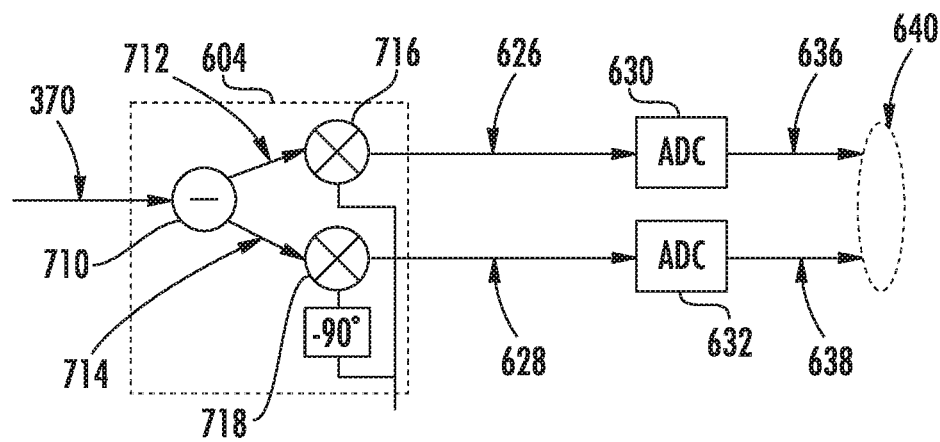
FIG. 7B is a schematic diagram providing an exemplary illustration of the uplink I/Q mixer of FIG. 6 for processing uplink I/Q elements.

The uplink I/Q mixer 604 is illustrated and discussed next with reference to FIG. 7B. In this regard, FIG. 7B is a schematic diagram providing an exemplary illustration of the uplink I/Q mixer 604 of FIG. 6 for processing uplink I/Q elements. Common elements between FIGS. 6 and 7B are shown therein with common element numbers and will not be re-described herein.

With reference to FIG. 7B, the uplink I/Q mixer 604 includes a splitter 710. The splitter 710 receives the uplink analog communications signal 370. The splitter 710 splits the uplink analog communications signal 370 into a modulated analog I-element signal 712 and a modulated analog Q-element signal 714. The uplink I/Q mixer 604 includes an I-element signal de-modulator 716 and a Q-element signal de-modulator 718. The I-element signal de-modulator 716 receives the modulated analog I-element signal 712 and generates the uplink analog I-element signal 626. The Q-element signal de-modulator 718 receives the modulated analog Q-element signal 714 and generates the uplink analog Q-element signal 628. The uplink analog Q-element signal 628 is at a −90° phase offset from the uplink analog I-element signal 626.

As previously mentioned, the transceiver circuit 300 of FIG. 3 is capable of supporting additional downlink analog signal path(s) and/or uplink analog signal path(s). In this regard, FIG. 8 is a schematic diagram providing an exemplary illustration of the transceiver circuit 300 of FIG. 3 configured to support a third downlink analog signal path 800 and a third uplink analog signal path 802.

Figure 8:
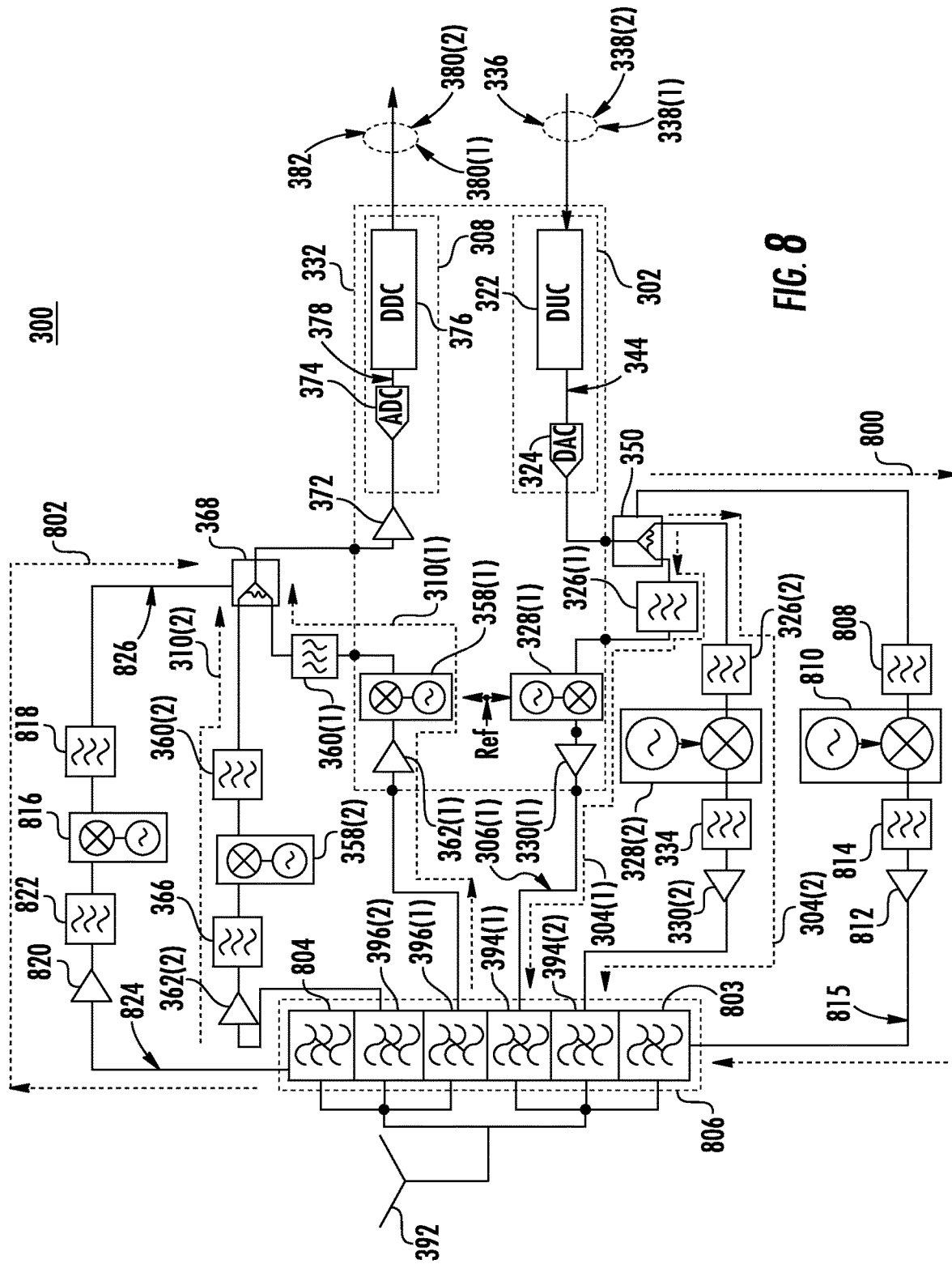
FIG. 8 is a schematic diagram providing an exemplary illustration of the transceiver circuit of FIG. 3 configured to support a third downlink analog signal path and a third uplink analog signal path.

With reference to FIG. 8, a third downlink coupler 803 and a third uplink coupler 804 are added to the coupling circuit 390 of FIG. 3 to form a coupling circuit 806. The third downlink analog signal path 800 is provided between the downlink signal splitter 350 and the third downlink coupler 803. The third downlink analog signal path 800 includes a third downlink analog filter 808 and a third up-conversion circuit 810. The third downlink analog signal path 800 may also include a third downlink power amplifier 812 and an add-on downlink analog filter 814. The third downlink analog signal path 800 is configured to generate and provide a third downlink analog RF communications signal 815 to the third downlink coupler 803. The third downlink analog filter 808, the third up-conversion circuit 810, the third downlink power amplifier 812, and the add-on downlink analog filter 814 are functionally equivalent to the second downlink analog filter 326(2), the second up-conversion circuit 328(2), the second downlink power amplifier 330(2), and the secondary downlink analog filter 334 of FIG. 3, respectively.

The third uplink analog signal path 802 is provided between the third uplink coupler 804 and the signal combiner 368. The third uplink analog signal path 802 includes a third down-conversion circuit 816 and a third uplink analog filter 818. The third uplink analog signal path 802 may also include a third uplink power amplifier 820 and an add-on uplink analog filter 822. The third uplink analog signal path 802 is configured to receive a third uplink analog RF communications signal 824 from the third uplink coupler 804. The third uplink analog signal path 802 is configured to provide a third uplink analog signal 826 to the signal combiner 368. The third down-conversion circuit 816, the third uplink analog filter 818, the third uplink power amplifier 820, and the add-on uplink analog filter 822 are functionally equivalent to the second down-conversion circuit 358(2), the second uplink analog filter 360(2), the second uplink power amplifier 362(2), and the secondary uplink analog filter 366 of FIG. 3, respectively.

Figure 9:
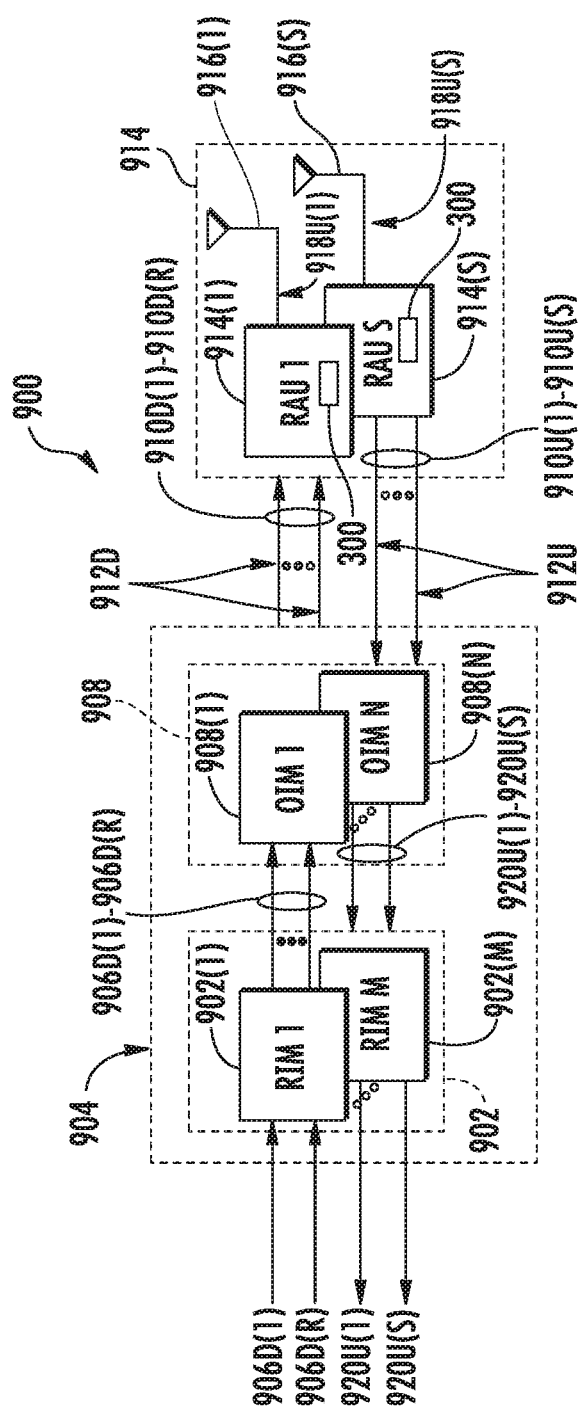
FIG. 9 is a schematic diagram of an exemplary optical fiber-based WDS provided in the form of an optical fiber-based DAS that can employ the transceiver circuit of FIG. 3 that employs shared digital signal processing circuitry for communicating RF analog communications signal in the WDS.

FIG. 9 is a schematic diagram of an exemplary optical fiber-based WDS 900 provided in the form of an optical fiber-based DAS that can employ the transceiver circuit 300 of FIG. 3 that employs shared digital signal processing circuitry for communicating RF analog communications signals in the optical fiber-based WDS 900. The optical fiber-based WDS 900 includes an optical fiber for distributing communications services for multiple frequency bands. The optical fiber-based WDS 900 in this example includes three (3) main components. One or more radio interfaces provided in the form of radio interface modules (RIMs) 902(1)-902(M) are provided in a central unit 904 to receive and process downlink electrical communications signals 906D(1)-906D(R) prior to optical conversion into downlink optical fiber-based communications signals. The downlink electrical communications signals 906D(1)-906D (R) may be received from a base station (not shown) as an example. The RIMs 902(1)-902(M) provide both downlink and uplink interfaces for signal processing. The notations "1-R" and "1-M" indicate that any number of the referenced component, 1-R and 1-M, respectively, may be provided. The central unit 904 is configured to accept the RIMs 902(1)-902(M) as modular components that can easily be installed and removed or replaced in the central unit 904. In one example, the central unit 904 is configured to support up to twelve (12) RIMs 902(1)-902(12). Each RIM 902(1)-902 (M) can be designed to support a particular type of radio source or range of radio sources (i.e., frequencies) to provide flexibility in configuring the central unit 904 and the optical fiber-based WDS 900 to support the desired radio sources.

For example, one RIM 902 may be configured to support the PCS radio band. Another RIM 902 may be configured to support the 800 MHz radio band. In this example, by inclusion of these RIMs 902, the central unit 904 could be configured to support and distribute communications signals on both PCS and LTE 700 radio bands, as an example. The RIMs 902 may be provided in the central unit 904 that support any frequency bands desired, including but not limited to the US Cellular band, PCS band, AWS band, 700 MHz band, Global System for Mobile communications (GSM) 900, GSM 1800, and Universal Mobile Telecommunications System (UMTS). The RIMs 902(1)-902(M) may also be provided in the central unit 904 that support any wireless technologies desired, including but not limited to Code Division Multiple Access (CDMA), CDMA200, 1×RTT, Evolution—Data Only (EV-DO), UMTS, Highspeed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 902(1)-902(M) may be provided in the central unit 904 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 9, the downlink electrical communications signals 906D(1)-906D(R) are provided to a plurality of optical interfaces provided in the form of optical interface modules (OIMs) 908(1)-908(N) in this embodiment to convert the downlink electrical communications signals 906D(1)-906D(R) into downlink optical fiber-based communications signals 910D(1)-910D(R). The notation "1-N" indicates that any number of the referenced component 1-N may be provided. The OIMs 908(1)-908(N) may be configured to provide one or more optical interface components (OICs) that contain O/E and E/O converters (not shown), as will be described in more detail below. The OIMs 908(1)-908(N) support the radio bands that can be provided by the RIMs 902(1)-902(M), including the examples previously described above.

The OIMs 908(1)-908(N) each include E/O converters to convert the downlink electrical communications signals 906D(1)-906D(R) into the downlink optical fiber-based communications signals 910D(1)-910D(R). The downlink optical fiber-based communications signals 910D(1)-910D (R) are communicated over a downlink optical fiber-based communications medium 912D to a plurality of remote units 914(1)-914(S), which may be remote antenna units (RAUs) for example. The notation "1-S" indicates that any number of the referenced component 1-S may be provided. Remote unit O/E converters provided in the remote units 914(1)-914(S) convert the downlink optical fiber-based communications signals 910D(1)-910D(R) back into the downlink electrical communications signals 906D(1)-906D(R), which are provided to antennas 916(1)-916(S) in the remote units 914(1)-914(S) to client devices (not shown) in the reception range of the antennas 916(1)-916(S). The transceiver circuit 300 of FIG. 3 may be provided in at least one of the RAUs 914(1)-914(S) for communicating at least one of the downlink electrical communications signals 906D(1)-906D(R) and/or at least one of uplink electrical communications signals 918U(1)-918U(S).

Remote unit E/O converters are also provided in the remote units 914(1)-914(S) to convert uplink electrical communications signals 918U(1)-918U(S) received from client devices through the antennas 916(1)-916(S) into uplink optical fiber-based communications signals 910U(1)-910U(S). The remote units 914(1)-914(S) communicate the uplink optical fiber-based communications signals 910U(1)-910U(S) over an uplink optical fiber-based communications medium 912U to the OIMs 908(1)-908(N) in the central unit 904. The OIMs 908(1)-908(N) include O/E converters that convert the received uplink optical fiber-based communications signals 910U(1)-910U(S) into uplink electrical communications signals 920U(1)-920U(S), which are processed by the RIMs 902(1)-902(M) and provided as the uplink electrical communications signals 920U(1)-920U(S). The central unit 904 may provide the uplink electrical communications signals 920U(1)-920U(S) to a base station or other communications system.

Note that the downlink optical fiber-based communications medium 912D and the uplink optical fiber-based communications medium 912U connected to each remote unit 914(1)-914(S) may be a common optical fiber-based communications medium, wherein for example, wave division multiplexing (WDM) is employed to provide the downlink optical fiber-based communications signals 910D(1)-910D (R) and the uplink optical fiber-based communications signals 910U(1)-910U(S) on the same optical fiber-based communications medium.

Figure 10:
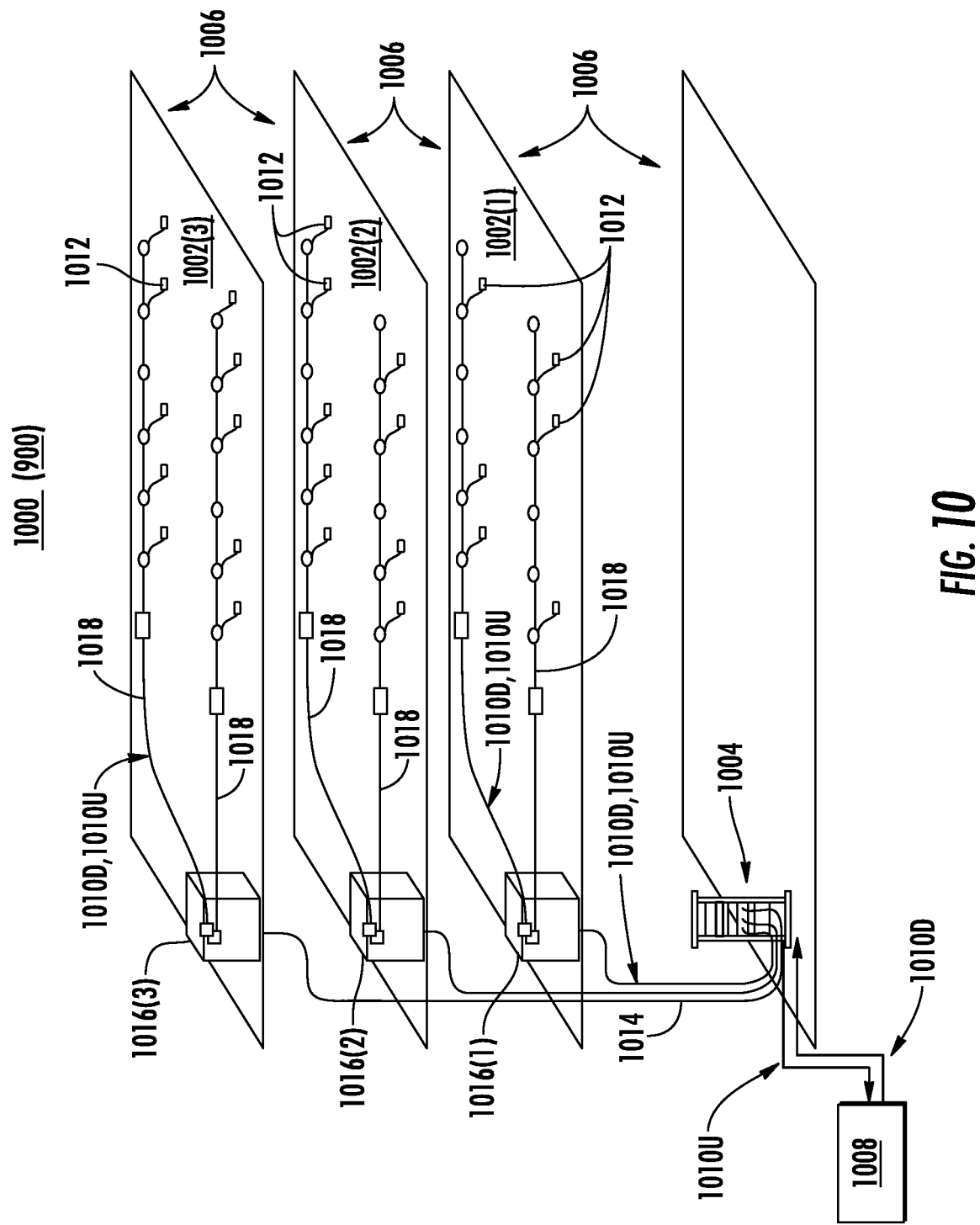
FIG. 10 is a partial schematic cut-away diagram of an exemplary building infrastructure in which the optical fiber-based WDS of FIG. 9 employing the transceiver circuit of FIG. 3 can be provided.

The optical fiber-based WDS 900 of FIG. 9 employing the transceiver circuit 300 of FIG. 3 may be provided in an indoor environment, as illustrated in FIG. 10. FIG. 10 is a partial schematic cut-away diagram of an exemplary building infrastructure 1000 in which the optical fiber-based WDS 900 of FIG. 9 employing the transceiver circuit 300 of FIG. 3 can be employed. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004 is communicatively coupled to a base station 1008 to receive downlink communications signals 1010D from the base station 1008. The central unit 1004 is communicatively coupled to a plurality of remote units 1012 to distribute the downlink communications signals 1010D to the remote units 1012 and to receive uplink communications signals 1010U from the remote units 1012, as previously discussed above. The downlink communications signals 1010D and the uplink communications signals 1010U communicated between the central unit 1004 and the remote units 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the remote units 1012 and also provide power to the remote units 1012 via array cables 1018.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

Various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for communicating radio frequency (RF) analog communications signals by sharing digital signal processing circuitry in a wireless distribution system (WDS), comprising:
   receiving a downlink digital communications signal comprising a first downlink digital baseband signal in a first downlink digital channel and a second downlink digital baseband signal in a second downlink digital channel;
   generating an intermediate downlink digital communications signal comprising the first downlink digital baseband signal in a first selected downlink frequency and the second downlink digital baseband signal in a second selected downlink frequency;
   converting the intermediate downlink digital communications signal into a downlink analog communications signal comprising a first downlink analog signal in the first selected downlink frequency and a second downlink analog signal in the second selected downlink frequency;
   converting the first downlink analog signal into a first downlink analog RF communications signal in a first downlink analog RF channel; and
   converting the second downlink analog signal into a second downlink analog RF communications signal in a second downlink analog RF channel;
   wherein the first downlink analog RF communications signal in the first downlink analog RF channel and the second downlink analog RF communications signal in the second downlink analog RF channel occupy a downlink RF spectrum wider than a predefined downlink digital signal processing bandwidth associated with generating the intermediate downlink digital communications signal and converting the intermediate downlink digital communications signal into the downlink analog communications signal.

2. The method of claim 1, further comprising receiving the downlink digital communications signal comprising the first downlink digital baseband signal in the first downlink digital channel and the second downlink digital baseband signal in the second downlink digital channel that occupy a downlink digital spectrum narrower than the the predefined downlink digital signal processing bandwidth.

3. The method of claim 1, further comprising generating a third downlink analog RF communications signal.

4. The method of claim 1, further comprising:
   receiving a first uplink analog RF communications signal in a first uplink analog RF channel;
   converting the first uplink analog RF communications signal into a first uplink analog signal in a first selected uplink frequency;
   receiving a second uplink analog RF communications signal in a second uplink analog RF channel;
   converting the second uplink analog RF communications signal into a second uplink analog signal in a second selected uplink frequency; and
   generating an uplink analog communications signal comprising the first uplink analog signal in the first selected uplink frequency and the second uplink analog signal in the second selected uplink frequency.

5. The method of claim 4, further comprising:
   converting the uplink analog communications signal into an intermediate uplink digital communications signal comprising a first uplink digital baseband signal in the first selected uplink frequency and a second uplink digital baseband signal in the second selected uplink frequency; and generating an uplink digital communications signal comprising the first uplink digital baseband signal in a first uplink digital channel and the second uplink digital baseband signal in a second uplink digital channel.

6. The method of claim 5, further comprising generating the uplink digital communications signal comprising the first uplink digital baseband signal in the first uplink digital channel and the second uplink digital baseband signal in the second uplink digital channel that occupy an uplink digital spectrum narrower than a predefined uplink digital signal processing bandwidth of an uplink digital signal processing circuitry.

7. The method of claim 5, further comprising receiving the first uplink analog RF communications signal in the first uplink analog RF channel and the second uplink analog RF communications signal in the second uplink analog RF channel that occupy an uplink RF spectrum wider than a predefined uplink digital signal processing bandwidth of an uplink digital signal processing circuitry.

8. The method of claim 4, further comprising receiving a third uplink analog RF communications signal and generating a third uplink analog signal.

9. A wireless distribution system (WDS), comprising:
a central unit; and
a plurality of remote units configured to:
receive a plurality of downlink electrical communications signals from the central unit; and
provide a plurality of uplink electrical communications signals to the central unit;
wherein at least one remote unit among the plurality of remote units comprises a transceiver circuit, comprising:
downlink digital signal processing circuitry having a predefined downlink digital signal processing bandwidth, the downlink digital signal processing circuitry comprising:
a digital up-converter (DUC) configured to:
receive a downlink digital communications signal among the plurality of downlink electrical communications signals, the downlink digital communications signal comprising a first downlink digital baseband signal in a first downlink digital channel and a second downlink digital baseband signal in a second downlink digital channel; and
generate an intermediate downlink digital communications signal comprising the first downlink digital baseband signal in a first selected downlink frequency and the second downlink digital baseband signal in a second selected downlink frequency; and
a digital-to-analog converter (DAC) configured to receive and convert the intermediate downlink digital communications signal into a downlink analog communications signal comprising a first downlink analog signal in the first selected downlink frequency and a second downlink analog signal in the second selected downlink frequency;
a first downlink analog signal path configured to:
receive the downlink analog communications signal; and
convert the first downlink analog signal into a first downlink analog radio frequency (RF) communications signal in a first downlink analog RF channel; and
a second downlink analog signal path configured to:
receive the downlink analog communications signal; and
convert the second downlink analog signal into a second downlink analog RF communications signal in a second downlink analog RF channel;
wherein the first downlink analog RF communications signal in the first downlink analog RF channel and the second downlink analog RF communications signal in the second downlink analog RF channel occupy a downlink RF spectrum wider than the predefined downlink digital signal processing bandwidth of the downlink digital signal processing circuitry.

10. The WDS of claim 9, wherein the DUC is configured to receive the downlink digital communications signal comprising the first downlink digital baseband signal in the first downlink digital channel and the second downlink digital baseband signal in the second downlink digital channel that occupy a downlink digital spectrum narrower than the predefined downlink digital signal processing bandwidth of the downlink digital signal processing circuitry.

11. The WDS of claim 9, further comprising a third downlink analog signal path configured to receive the downlink analog communications signal from the DAC and generate a third downlink analog RF communications signal.

12. The WDS of claim 9, wherein the transceiver circuit further comprises:
a first uplink analog signal path configured to:
receive a first uplink analog RF communications signal in a first uplink analog RF channel; and
convert the first uplink analog RF communications signal into a first uplink analog signal in a first selected uplink frequency;
a second uplink analog signal path configured to:
receive a second uplink analog RF communications signal in a second uplink analog RF channel; and
convert the second uplink analog RF communications signal into a second uplink analog signal in a second selected uplink frequency; and
a signal combiner configured to generate an uplink analog communications signal comprising the first uplink analog signal in the first selected uplink frequency and the second uplink analog signal in the second selected uplink frequency.

13. The WDS of claim 12, wherein the transceiver circuit further comprises:
uplink digital signal processing circuitry having a predefined uplink digital signal processing bandwidth, the uplink digital signal processing circuitry comprising:
an analog-to-digital converter (ADC) configured to receive and convert the uplink analog communications signal into an intermediate uplink digital communications signal comprising a first uplink digital baseband signal in the first selected uplink frequency and a second uplink digital baseband signal in the second selected uplink frequency; and
a digital down-converter (DDC) configured to:
receive the intermediate uplink digital communications signal from the ADC; and
generate an uplink digital communications signal among the plurality of uplink electrical communications signals comprising the first uplink digital baseband signal in a first uplink digital channel and the second uplink digital baseband signal in a second uplink digital channel.

14. The WDS of claim 13, wherein the DDC is configured to generate the uplink digital communications signal comprising the first uplink digital baseband signal in the first uplink digital channel and the second uplink digital baseband signal in the second uplink digital channel that occupy an uplink digital spectrum narrower than the predefined uplink digital signal processing bandwidth of the uplink digital signal processing circuitry.

15. The WDS of claim 13, wherein the first uplink analog signal path and the second uplink analog signal path are respectively configured to receive the first uplink analog RF communications signal in the first uplink analog RF channel and the second uplink analog RF communications signal in the second uplink analog RF channel that occupy an uplink RF spectrum wider than the predefined uplink digital signal processing bandwidth of the uplink digital signal processing circuitry.

16. The WDS of claim 13, further comprising a third uplink analog signal path configured to receive a third uplink analog RF communications signal and provide a third uplink analog signal to the signal combiner.

17. The WDS of claim 9, wherein the central unit comprises:
an electrical-to-optical (E/O) converter configured to convert the plurality of downlink electrical communications signals into a plurality of downlink optical fiber-based communications signals, respectively; and
an optical-to-electrical (O/E) converter configured to convert a plurality of uplink optical fiber-based communications signals into the plurality of uplink electrical communications signals, respectively.

18. The WDS of claim 17, wherein the plurality of remote units comprises:
a plurality of remote unit O/E converters configured to convert the plurality of downlink optical fiber-based communications signals into the plurality of downlink electrical communications signals, respectively; and
a plurality of remote unit E/O converters configured to convert the plurality of uplink electrical communications signals into the plurality of uplink optical fiber-based communications signals, respectively.

* * * * *

UNITED STATES PATENT AND TRADEMARK OFFICE
CERTIFICATE OF CORRECTION

PATENT NO. : 10,687,176 B2
APPLICATION NO. : 16/195764
DATED : June 16, 2020
INVENTOR(S) : Maor Saig Page 1 of 1

It is certified that error appears in the above-identified patent and that said Letters Patent is hereby corrected as shown below:

In the Claims

In Column 22, Line 45, Claim 2, delete "the the" and insert -- the --, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*